(12) United States Patent
Bernier et al.

(10) Patent No.: US 10,099,749 B2
(45) Date of Patent: *Oct. 16, 2018

(54) SNOWMOBILE HAVING ELECTRONICALLY CONTROLLED LUBRICATION

(71) Applicant: BOMBARDIER RECREATIONAL PRODUCTS INC., Valcourt (CA)

(72) Inventors: Michel Bernier, Sherbrooke (CA); Bruno Schuehmacher, Richmond (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 35 days.

This patent is subject to a terminal disclaimer.

(21) Appl. No.: 14/957,975

(22) Filed: Dec. 3, 2015

(65) Prior Publication Data

US 2016/0090153 A1    Mar. 31, 2016

Related U.S. Application Data

(63) Continuation of application No. 13/895,759, filed on May 16, 2013, now Pat. No. 9,228,581, which is a
(Continued)

(51) Int. Cl.
*B62M 27/02* (2006.01)
*F01M 1/02* (2006.01)
(Continued)

(52) U.S. Cl.
CPC .............. *B62M 27/02* (2013.01); *F01M 1/02* (2013.01); *F01M 1/16* (2013.01); *F02B 61/02* (2013.01);
(Continued)

(58) Field of Classification Search
CPC ............. B62M 27/02; B62M 2027/023; F04B 49/022; F01M 1/16; F01M 2011/0223;
(Continued)

(56) References Cited

U.S. PATENT DOCUMENTS 3,844,684 A   10/1974 Kawamura
4,284,943 A    8/1981 Rowe
(Continued)

FOREIGN PATENT DOCUMENTS

EP   0622528 A1   11/1994
EP   1394371 B1   10/2006
(Continued)

OTHER PUBLICATIONS

International Search Report of PCT/US2008/055477; dated Jul. 25, 2008; Pedro Cipriano.
(Continued)

*Primary Examiner* — Anne Marie M Boehler
(74) *Attorney, Agent, or Firm* — BCF LLP

(57) ABSTRACT

A snowmobile has a frame, an endless drive track, a pair of skis, an engine operatively connected to the endless drive track, an oil tank, an electronic oil pump and an electronic control unit (ECU). The engine has at least one cylinder, a crankcase, and at least one exhaust valve. The electronic oil pump fluidly communicates with the crankcase and the at least one exhaust valve. The oil tank fluidly communicates with an inlet of the electronic oil pump for supplying oil to the electronic oil pump. The electronic oil pump delivers oil from the oil tank to the crankcase and the at least one exhaust valve. The ECU is electrically connected to the electronic oil pump for controlling actuation of the electronic oil pump.

30 Claims, 13 Drawing Sheets

Related U.S. Application Data continuation of application No. 12/663,986, filed as application No. PCT/US2008/055477 on Feb. 29, 2008, now Pat. No. 8,459,392.

(60) Provisional application No. 60/945,709, filed on Jun. 22, 2007.

(51) Int. Cl.
*F01M 1/16* (2006.01)
*F04B 49/02* (2006.01)
*F02B 61/02* (2006.01)

(52) U.S. Cl.
CPC ..... *F04B 49/022* (2013.01); *B62M 2027/023* (2013.01); *F01M 2001/023* (2013.01); *F01M 2001/0223* (2013.01)

(58) Field of Classification Search
CPC ..... F01M 2011/2001; F01M 2011/023; F01M 2001/0223; F01M 2001/023
USPC ............... 180/182, 190; 123/196 R, 196 AB; 417/281, 279
See application file for complete search history.

(56) References Cited

U.S. PATENT DOCUMENTS

| | | | |
|---|---|---|---|
| 4,355,606 A | 10/1982 | Casey | |
| 4,539,943 A | 9/1985 | Tsuchikawa et al. | |
| 4,726,342 A | 2/1988 | Diener | |
| 4,903,653 A | 2/1990 | Slattery | |
| 4,934,907 A | 6/1990 | Kroner | |
| 5,042,840 A | 8/1991 | Rieple et al. | |
| 5,048,483 A | 9/1991 | Nakazawa | |
| 5,377,637 A | 1/1995 | Leighton et al. | |
| 5,800,139 A | 9/1998 | Yamada | |
| 5,921,758 A | 7/1999 | Anamoto et al. | |
| 6,067,959 A | 5/2000 | Fassler et al. | |
| 6,247,446 B1 | 6/2001 | Fassler et al. | |
| 6,422,183 B1 | 7/2002 | Kato | |
| 6,477,992 B2 | 11/2002 | Hartke et al. | |
| 6,715,460 B2 | 4/2004 | Ashida et al. | |
| 6,817,338 B2 | 11/2004 | Janic et al. | |
| 6,845,751 B2 | 1/2005 | Lee | |
| 6,964,254 B1 | 11/2005 | Koerner et al. | |
| 7,409,937 B2 | 8/2008 | Hisahara et al. | |
| 7,410,398 B2 | 8/2008 | Hunt et al. | |
| 7,440,832 B2 | 10/2008 | Steen et al. | |
| 8,162,632 B2 | 4/2012 | Hunt et al. | |
| 8,459,392 B2 | 6/2013 | Bernier et al. | |
| 2002/0068662 A1 | 6/2002 | Jeon | |
| 2002/0083915 A1 | 7/2002 | Choi | |
| 2002/0148662 A1 | 10/2002 | Ashida et al. | |
| 2002/0172604 A1 | 11/2002 | Berger | |
| 2003/0145825 A1 | 8/2003 | Janic et al. | |
| 2003/0148850 A1 | 8/2003 | Tomohiro et al. | |
| 2003/0161733 A1 | 8/2003 | Kabasawa et al. | |
| 2003/0209225 A1 | 11/2003 | Lee | |
| 2003/0216093 A1 | 11/2003 | Koerner et al. | |
| 2004/0136838 A1 | 7/2004 | Resh et al. | |
| 2004/0187813 A1* | 9/2004 | Meyer | F01M 3/02 123/73 AD |
| 2005/0053470 A1 | 3/2005 | Yamazaki et al. | |
| 2005/0199431 A1 | 9/2005 | Hoi | |
| 2005/0217618 A1 | 10/2005 | Vvatanabe et al. | |
| 2005/0247498 A1 | 11/2005 | Pichler et al. | |
| 2006/0116806 A1 | 6/2006 | Steen et al. | |
| 2007/0151787 A1* | 7/2007 | Ashida | B62M 27/02 180/190 |
| 2007/0204817 A1 | 9/2007 | Russell et al. | |
| 2011/0162613 A1 | 7/2011 | Schiffer et al. | |
| 2011/0274560 A1 | 11/2011 | Clark et al. | |
| 2012/0245820 A1 | 9/2012 | Miyamoto | |

FOREIGN PATENT DOCUMENTS

| | | |
|---|---|---|
| RU | 2105161 C1 | 2/1998 |
| SU | 1562482 A1 | 5/1990 |
| SU | 1706909 A1 | 1/1992 |

OTHER PUBLICATIONS

English abstract of SU1706909, Published Jan. 23, 1992.
English abstract of SU1562482, Published May 7, 1990.
English abstract of RU2105161, retrieved from http://worldwide.espacenet.com/ on Jan. 7, 2016.
Internet Archive WayBackMachine, Idle Speed, [online], [Retrieved on May 16, 2013], Retrieved from the Internet: http://web.archive.org/web/20060913000000/http://en.wikipedia.org/wik/Idle_speed.
BRP US Inc.; EVINRUDE E-TEC 2006—Parts Catalog 40-60 HP; Cover page and pp. 5 to 9, 11, 13, 14 and 17 to 19; Printed in the USA; 2005.

* cited by examiner

SNOWMOBILE HAVING ELECTRONICALLY CONTROLLED LUBRICATION

CROSS-REFERENCE

The present application is a continuation of U.S. patent application Ser. No. 13/895,759, filed May 16, 2013, which a continuation of U.S. patent application Ser. No. 12/663,986, filed Dec. 10, 2009, now U.S. Pat. No. 8,459,392, issued Jun. 11, 2013, which is a National Phase Entry of International Patent Application PCT/US2008/055477, filed Feb. 29, 2008. Through International Patent Application PCT/US2008/055477, the present application claims priority to U.S. Provisional Patent Application No. 60/945,709, filed Jun. 22, 2007. The entirety of these applications is incorporated herein by reference.

FIELD OF THE INVENTION

The present invention relates to a snowmobile having electronically controlled lubrication.

BACKGROUND OF THE INVENTION

Snowmobiles conventionally have a lubrication system that uses an oil pump that is mechanically driven by an engine of the snowmobile. This type of oil pump is generally referred to as a mechanical oil pump.

When the engine operates on a four-stroke principle, the lubricant is stored in an oil tank that is usually connected or integrated to the engine, such as an oil pan. The mechanical oil pump pumps the lubricant from the oil tank to make it circulate through the engine. After circulating through the engine, the lubricant is returned to the oil tank.

When the engine operates on a two-stroke principle, the lubricant is stored in an oil tank that is usually spaced apart from the engine. The mechanical oil pump pumps the lubricant from the oil tank to the crankcase of the engine. From the crankcase, the lubricant flows to the cylinders where it is combusted with a mixture of fuel and air. Since the lubricant is combusted by the engine, the oil tank occasionally needs to be refilled with lubricant for the engine to operate properly.

By having the mechanical oil pump driven by the engine, the amount of lubricant being pumped is directly proportional to the speed of the engine. Therefore, the faster the engine turns, the more lubricant is being pumped by the mechanical oil pump, and the relationship between engine speed and the amount of lubricant being pumped is a linear one. However, the actual lubricant requirements of an engine, especially in the case of an engine operating on a two-stroke principle, are not linearly proportional to the engine speed.

Some mechanical oil pumps driven by the engine are also linked to the throttle lever that is operated by the driver of the vehicle, such that the position of the throttle lever adjusts the output of the mechanical oil pump. Although this provides for an improved supply of lubricant to the engine, it does not account for other factors which affect the actual lubricant requirements of the engine such as ambient air temperature and altitude.

For a two-stroke engine, the actual lubricant requirement depends, at least in part, on the power output of the engine, not engine speed. The higher the power output, the more lubricant is required. There are instances during the operation of the two-stroke engine where the engine speed is high, but where the power output of the engine is low. In such instances, the mechanical oil pump driven by the engine provides a lot of lubricant even though the actual requirements are low. One such instance is when the track of the snowmobile is slipping on a patch of ice. In this instance the engine speed is high due to the slippage, but the actual power output is low. There are other instances where the actual lubricant requirements are lower than what would be provided by a mechanical oil pump driven by the engine. For example, at start-up, all of the lubricant that was present in the engine when it was stopped has accumulated at the bottom of the crankcase. The accumulated lubricant would sufficient to lubricate the engine for the first few minutes of operation, however the mechanical oil pump, due to its connection to the engine, adds lubricant regardless. Therefore, in the case of an engine operating on the two-stoke principle, using a mechanical oil pump results in more lubricant being consumed by the engine than is actually required. This also results in a level of exhaust emissions that is higher than a level of exhaust emissions that would result from supplying the engine with its actual lubricant requirements since more lubricant gets combusted than is necessary.

The actual lubricant requirements of an engine for a snowmobile are also a function of one or more of the altitude at which the snowmobile is operating, the engine temperature, and the position of the throttle lever, to name a few. Since snowmobiles are often operated in mountainous regions and that temperatures can vary greatly during the winter, the actual lubricant requirements of the engine can be significantly affected by these factors and therefore need to be taken into account. Conventional snowmobile lubrication systems using mechanical oil pumps, due to the linear relationship between the engine speed and the amount of lubricant being pumped, cannot take these into account.

In the prior art, mechanisms were provided on some snowmobiles which would modify the amount of lubricant provided by the oil pump per engine rotation. These mechanisms provided two (normal/high, or normal/low) or three (normal/high/low) oil pump settings. Although these settings provided some adjustment in the amount of lubricant being provided to the engine by the oil pump, since the pump is still mechanically connected to the engine, the relationship is still a linear one, and thus does not address all of the inconveniences described above. The settings simply provide consistently more or less lubricant, as the case may be, than at the normal settings.

Therefore, there is a need for a snowmobile having a lubrication system that provides an engine of the snowmobile with an amount of lubricant that is at or near the actual lubricant requirements of the engine.

There is also a need for a snowmobile having a lubrication system that supplies lubricant to an engine of the snowmobile non-linearly with respect to the engine speed and other factors.

Also, since a mechanical oil pump in snowmobiles is driven by the engine, the power required by the engine to drive the pump cannot be used to drive the track of the snowmobile.

Therefore, there is a need for a snowmobile having a lubrication system that requires less power from the engine than would be necessary to drive a conventional mechanical oil pump.

Finally, since snowmobiles are used during the winter, the ambient temperature can occasionally be low enough that the lubricant becomes too viscous to be efficiently pumped.

Therefore, there is also a need for a snowmobile having a lubrication system that can pump lubricant at low temperatures and for a method of operating the lubrication system.

SUMMARY OF THE INVENTION

It is an object of the present invention to ameliorate at least some of the inconveniences present in the prior art.

In one aspect, embodiments of the present technology provide a snowmobile having a frame. The frame has an engine compartment, and a tunnel rearward of the engine compartment. The snowmobile also has an endless drive track disposed below the tunnel for propelling the snowmobile, a pair of skis operatively connected to the frame and an engine disposed in the engine compartment. The engine is operatively connected to the endless drive track. The engine has at least one cylinder, a crankcase connected to the at least one cylinder, and at least one exhaust valve connected to the at least one cylinder. An electronic oil pump fluidly communicates with the crankcase and the at least one exhaust valve. An oil tank fluidly communicates with an inlet of the electronic oil pump for supplying oil to the electronic oil pump. The electronic oil pump delivers oil from the oil tank to the crankcase and the at least one exhaust valve. An electronic control unit (ECU) is electrically connected to the electronic oil pump for controlling actuation of the electronic oil pump.

In some embodiments of the present technology, the engine also has a crankshaft supported by at least one crankshaft bearing. The electronic oil pump fluidly communicates with the at least one crankshaft bearing to supply oil to the at least one crankshaft bearing.

In some embodiments of the present technology, the at least one cylinder is a pair of cylinders and the at least one exhaust valve is a pair of exhaust valves. The electronic oil pump has a pair of outlets. Each one of the pair of outlets fluidly communicates with a corresponding one of the pair of exhaust valves.

In some embodiments of the present technology, the pair of outlets is a first pair of outlets. The electronic oil pump has a second pair of outlets. Each one of the second pair of outlets fluidly communicates with a corresponding one of the pair of cylinders.

In some embodiments of the present technology, each outlet of the second pair of outlets is larger than each outlet of the first pair of outlets such that more oil is supplied to the pair of cylinders than to the pair of exhaust valves.

In some embodiments of the present technology, a muffler fluidly communicates with at least one exhaust port of the engine. The muffler is disposed to one side of the electronic oil pump. The electronic oil pump is disposed between the engine and the muffler.

In some embodiments of the present technology, a hood and side panels enclose the engine. The muffler and the electronic oil pump are disposed in an enclosure defined by the hood and the side panels.

In some embodiments of the present technology, a straddle seat is connected to the frame. The straddle seat is disposed rearward of the electronic oil pump.

In some embodiments of the present technology, the oil tank is disposed in the engine compartment.

In some embodiments of the present technology, the oil tank is connected to the frame, and the oil tank is disposed behind the engine.

In some embodiments of the present technology, a portion of the oil tank is translucent to permit inspection as to a level of lubricant in the oil tank.

In some embodiments of the present technology, an engine speed sensor is connected to the engine. The engine speed sensor is electrically connected to the ECU for transmitting a signal representative of engine speed to the ECU. The ECU controls the actuation of the electronic oil pump based at least in part on the signal representative of engine speed.

In some embodiments of the present technology, the snowmobile has at least one heat generating component. The electronic oil pump is disposed in proximity to the at least one heat generating component. The at least one heat generating component is at least one of: a muffler fluidly communicating with at least one exhaust port of the engine; a coolant hose fluidly communicating with a cooling system of the engine; and a heat exchanger fluidly communicating with a cooling system of the engine.

In some embodiments of the present technology, the electronic oil pump is disposed in proximity to the muffler, the coolant hose, and the heat exchanger.

In some embodiments of the present technology, the electronic oil pump is disposed in proximity to the engine.

In some embodiments of the present technology, the electronic oil pump includes a coil.

In some embodiments of the present technology, the electronic oil pump has at least one outlet angled relative to the inlet of the electronic oil pump. The electronic oil pump is disposed externally of the oil tank and is connected directly to an outlet of the oil tank below the outlet of the oil tank.

In some embodiments of the present technology, oil within the oil tank drains into the electronic oil pump by gravity.

In some embodiments of the present technology, a filter is disposed in the outlet of the oil tank upstream of the inlet of the electronic oil pump.

In some embodiments of the present technology, the electronic oil pump includes at least one piston adapted to reciprocate about an axis perpendicular to the inlet of the electronic oil pump.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
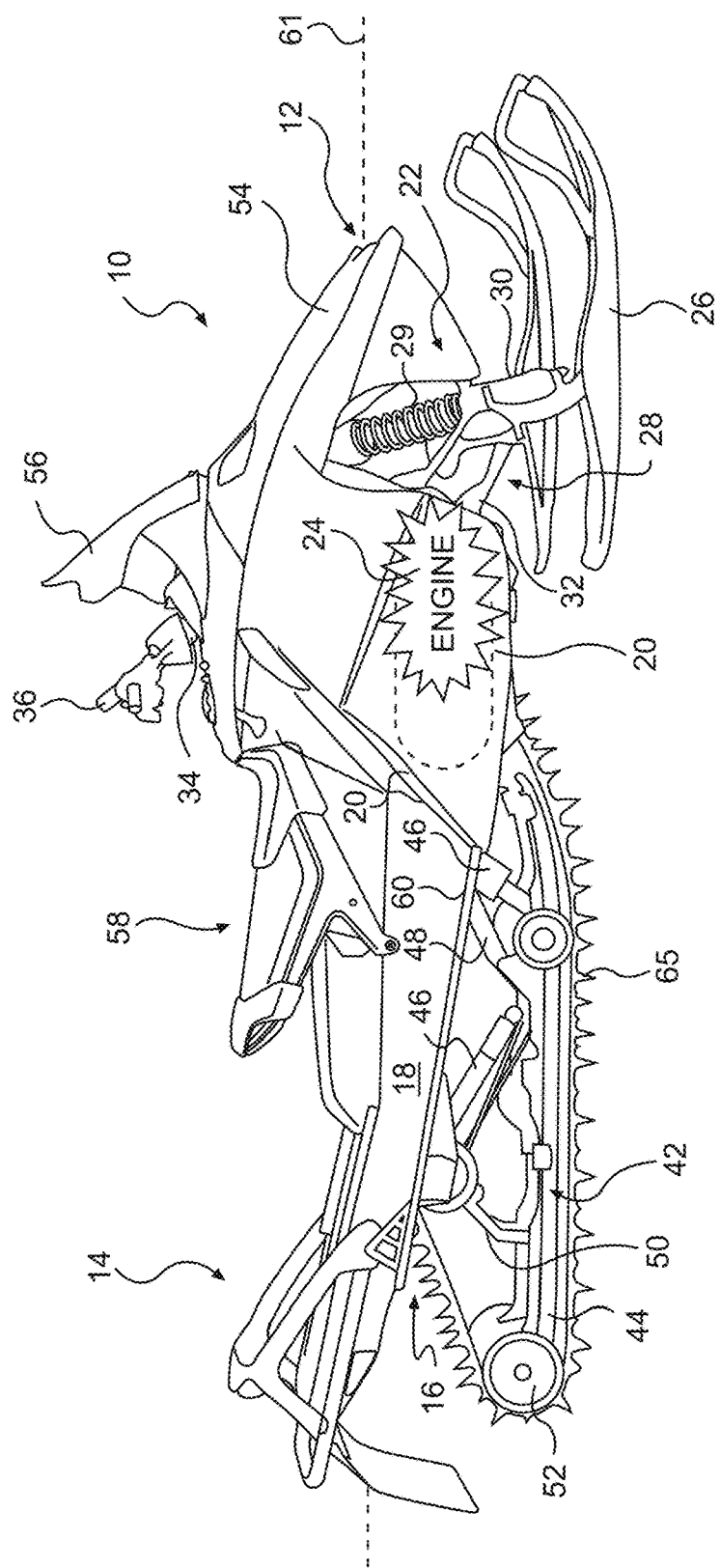
FIG. 1 is a right side elevation view of a snowmobile in accordance with the invention.

FIG. 1 illustrates a snowmobile 10 including a forward end 12 and a rearward end 14 which are defined consistently with a travel direction of the snowmobile 10. The snowmobile 10 includes a frame 16 which includes a tunnel 18 and an engine compartment 20. A front suspension 22 is connected to the frame. The tunnel 18 generally consists of one or more pieces of sheet metal bent to form an inverted U-shape. The tunnel 18 extends rearwardly along the longitudinal centerline 61 of the snowmobile 10 and is connected at the front to the engine compartment 20. An engine 24, which is schematically illustrated in FIG. 1, is carried by the engine compartment 20 of the frame 16. A steering assembly (not indicated) is provided, in which two skis 26 are positioned at the forward end 12 of the snowmobile 10 and are attached to the front suspension 22 through a pair of front suspension assemblies 28. Each front suspension assembly 28 includes a ski leg 30, a pair of A-arms 32 and a shock absorber 29 for operatively connecting the respective skis 26 to a steering column 34. Other types of front suspension assemblies 28 are contemplated, such as a swing-arm or a telescopic suspension. A steering device such as a handlebar 36, positioned forward of a rider, is attached to the upper end of the steering column 34 to allow the rider to rotate the ski legs 30 and thus the skis 26, in order to steer the snowmobile 10.

An endless drive track 65 is positioned at the rear end 14 of the snowmobile 10. The endless drive track 65 is disposed generally under the tunnel 18, and is operatively connected to the engine 24. The endless drive track 65 is driven to run about a rear suspension assembly 42 for propelling the snowmobile 10. The rear suspension assembly 42 includes a pair of slide rails 44 in sliding contact with the endless drive track 65. The rear suspension assembly 42 also includes one or more shock absorbers 46 which may further include a coil spring (not shown) surrounding the individual shock absorbers 46. Suspension arms 48 and 50 are provided to attach the slide rails 44 to the frame 16. One or more idler wheels 52 are also provided in the rear suspension assembly 42.

At the front end 12 of the snowmobile 10, fairings 54 enclose the engine 24, thereby providing an external shell that not only protects the engine 24, but can also be decorated to make the snowmobile 10 more aesthetically pleasing. Typically, the fairings 54 include a hood (not indicated) and one or more side panels which can be opened to allow access to the engine 24 when this is required, for example, for inspection or maintenance of the engine 24. In the particular snowmobile 10 shown in FIG. 1, the side panels can be opened along a vertical axis to swing away from the snowmobile 10. A windshield 56 is connected to the fairings 54 near the front end 12 of the snowmobile 10. Alternatively the windshield 56 can be connected directly to the handlebar 36. The windshield 56 acts as a wind screen to lessen the force of the air on the rider while the snowmobile 10 is moving.

A straddle-type seat 58 is positioned atop the frame 16. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

Figure 2:
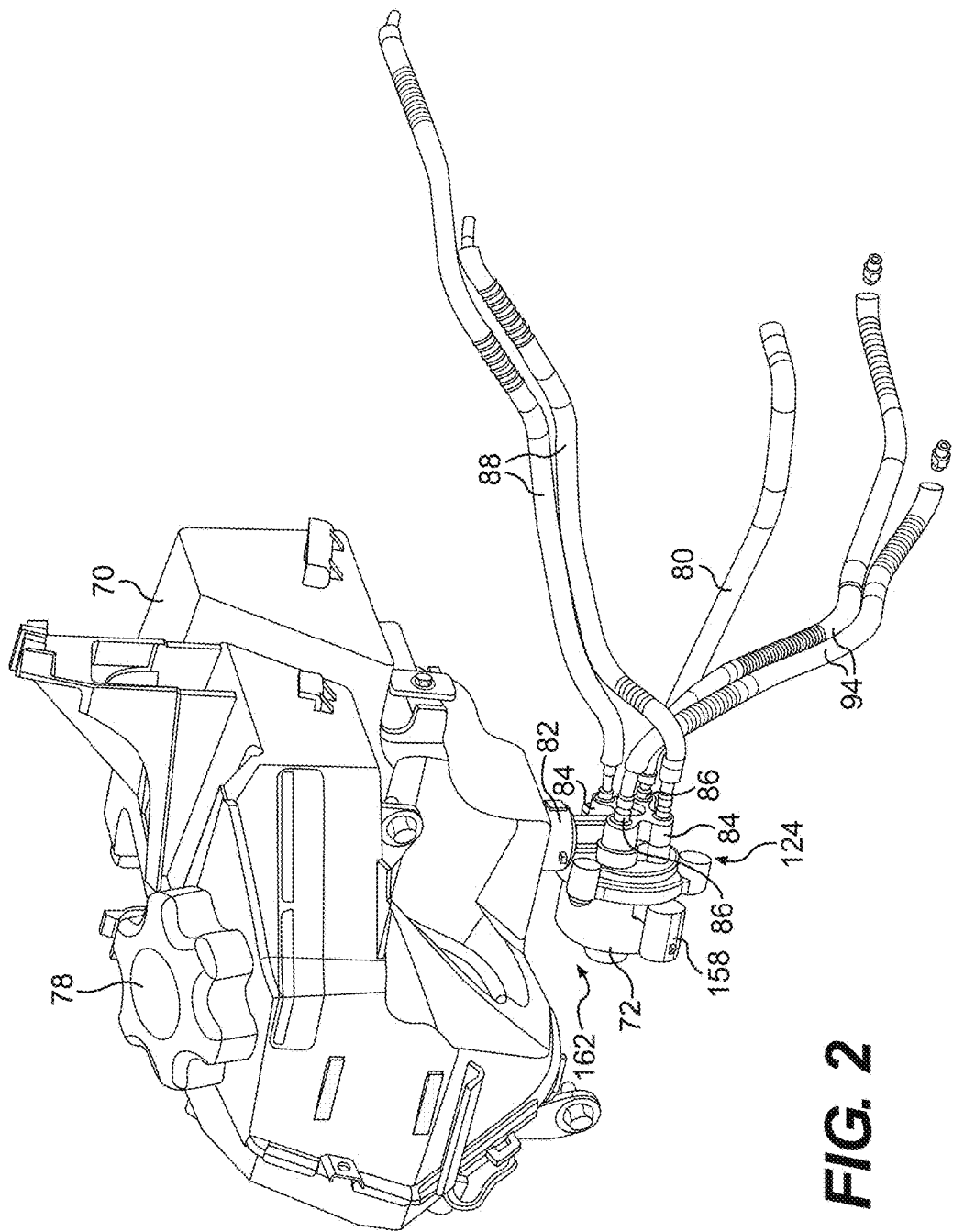
FIG. 2 is a perspective view from a front, right side, of an oil tank and electronic oil pump assembly to be used in the snowmobile of FIG. 1.
Figure 3:
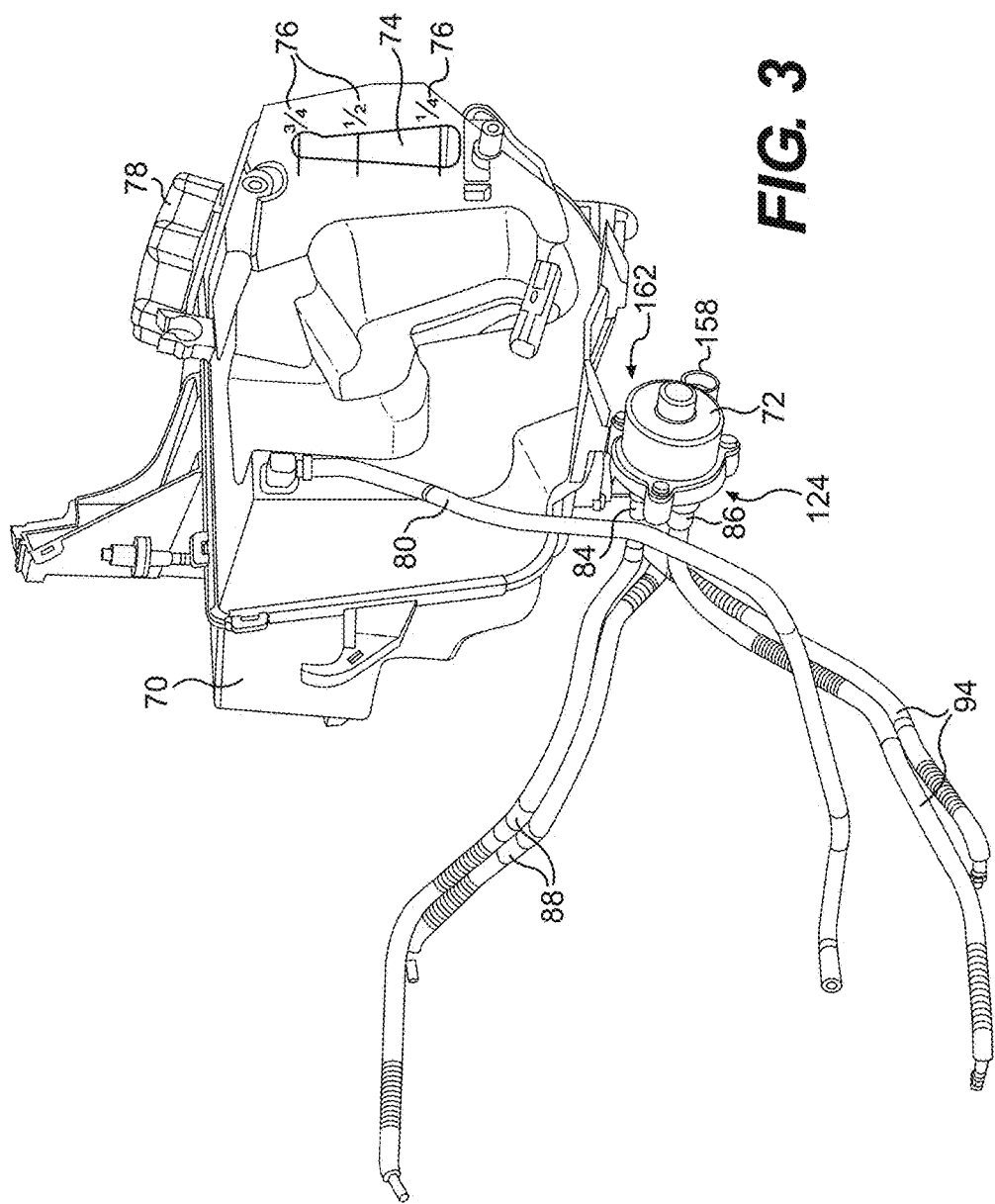
FIG. 3 is a perspective view from a rear, left side, of the oil tank and electronic oil pump assembly of FIG. 2.

Turning now to FIGS. 2 and 3, the lubrication system of the snowmobile 10 includes an oil tank 70 and an electronic oil pump 72. The oil tank 70 is disposed in the engine compartment 20 (see FIG. 4) and is shaped so as to fit between the various other components located in the engine compartment 20. The oil tank 70 is preferably fixed to the frame 18 and is preferably positioned slightly behind the engine 24. Since the oil tank 70 is not directly connected to the engine 24, the oil tank 70 is partially isolated from the vibration generated by the engine 24. The oil tank 70 is preferably made of plastic. As seen in FIG. 3, a portion 74 of the oil tank 70 is translucent to permit visible inspection as to the level of lubricant in the oil tank 70. Level markers 76 provide a visual indication as to the relative level of lubricant in the tank 70. A cap 78 is provided to open or close an oil filling opening (not shown) on the oil tank 70. A hose 80 extends from an upper portion of the oil tank 70 to a component of the engine 24, such as a water pump (not shown), to provide lubricant thereto. When the oil tank 70 is filled up above the level of the upper end of the hose 80, the hose 80 is filled with lubricant. The lubricant present in the hose 80 is then gradually fed by gravity to the component to which the hose 80 is connected. The volume of lubricant in the hose 80 is preferably sufficient to provide lubricant to the component until the oil tank 70 is once again filled up above the level of the upper end of the hose 80.

Figure 4:
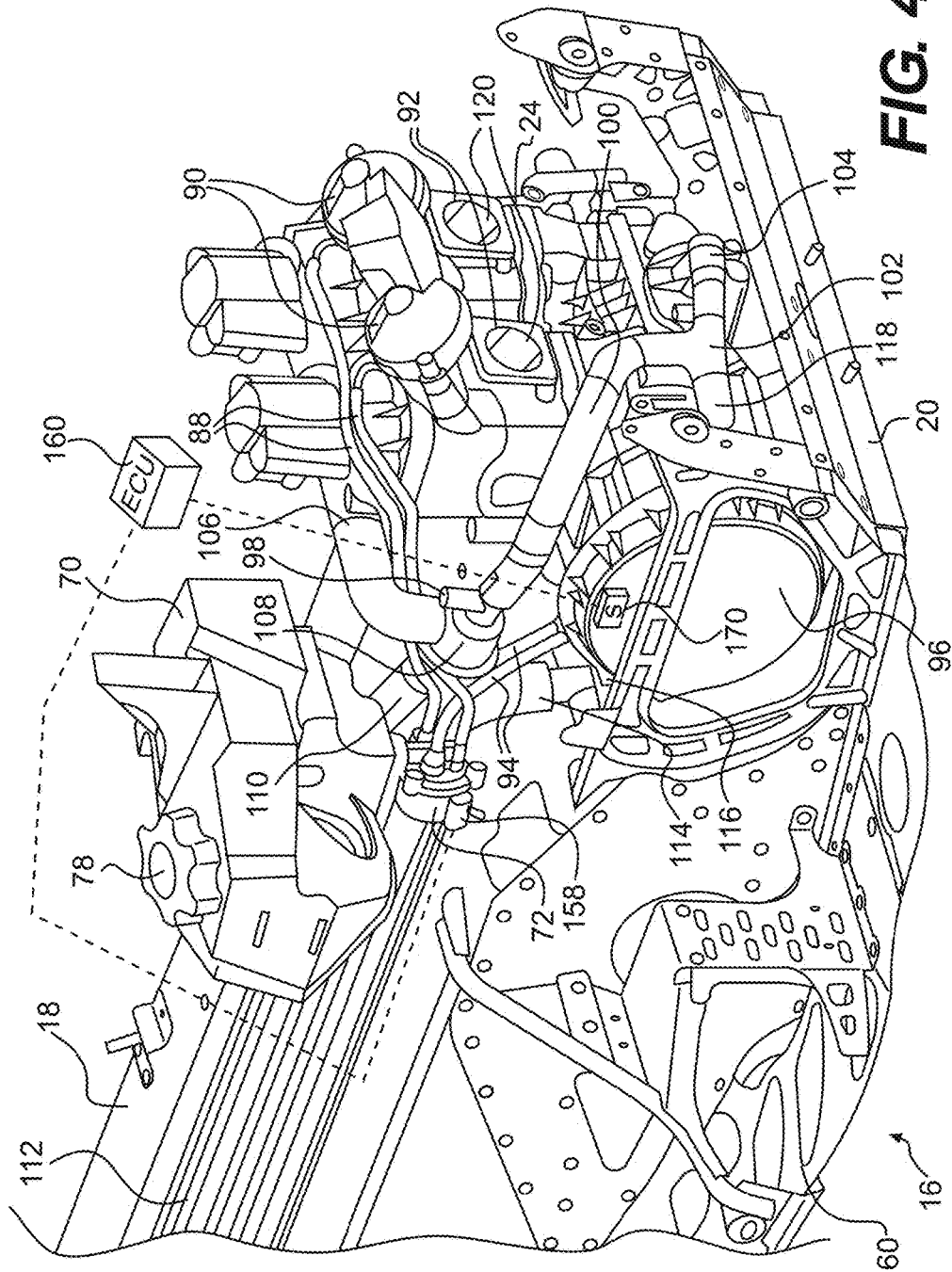
FIG. 4 is a perspective view from a front, right side, of internal components of the snowmobile of FIG. 1, with some of the components removed for clarity.
Figure 8:
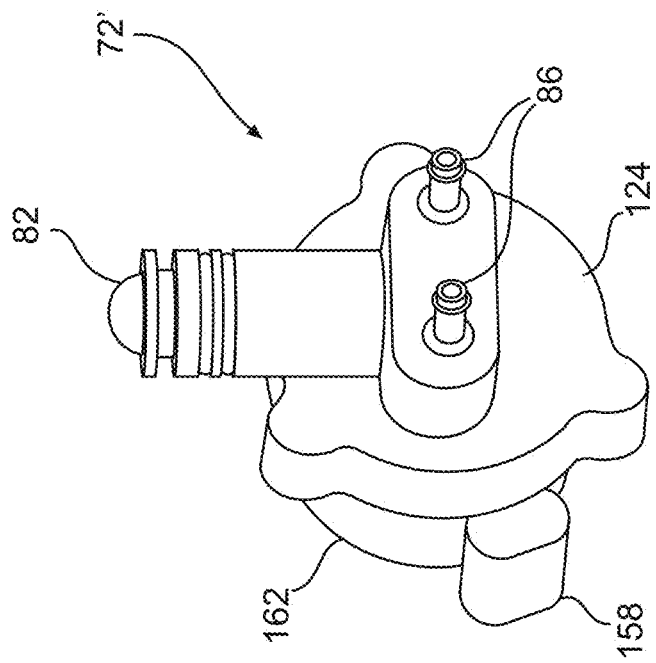
FIG. 8 is a perspective view from a front, right side, of the electronic oil pump of FIG. 7.
Figure 7:
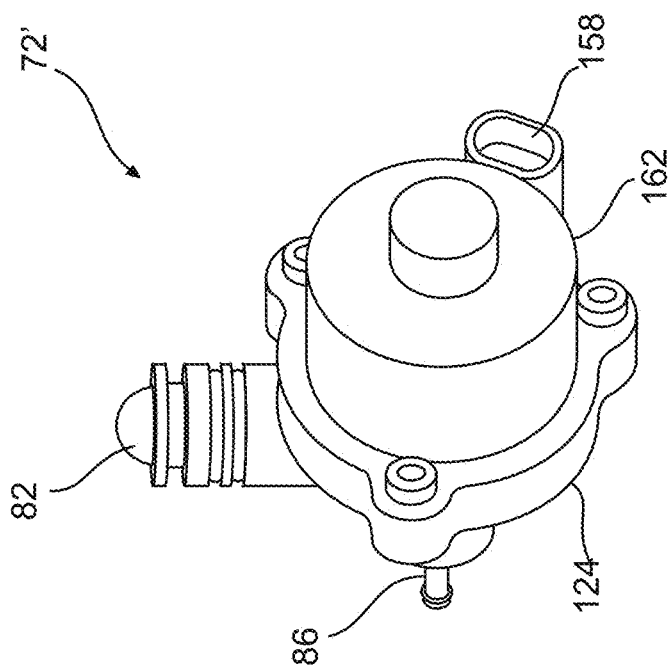
FIG. 7 is a perspective view from a rear, left side, of an alternative embodiment of the electronic oil pump of FIG. 6.

As can also be seen in FIGS. 2 and 3 the electronic oil pump 72 is disposed externally of the oil tank 70. An inlet 82 of the electronic oil pump 72 is connected directly to a bottom of the oil tank 70 on a side of the oil tank 70 opposite the side of the oil filling opening. The inlet 82 is preferably connected to the lowest point of the oil tank 70. The electronic oil pump 72 has four outlets 84, 86. The two outlets 84 are connected to hoses 88. As seen in FIG. 4, the hoses 88 are connected to the two exhaust valves 90 of the engine 24 (one exhaust valve 90 per cylinder 92.) to supply lubricant thereto. One possible construction of the exhaust valves 90 is described in U.S. Pat. No. 6,244,227, issued Jun. 12, 2001, incorporated herein by reference. It should be understood that other constructions of the exhaust valves 90 are contemplated which would not deviate from the present invention. The two outlets 86 are connected to hoses 94. As seen in FIG. 4, the hoses 94 are connected to the crankcase 96 of the engine 24. Each hose 94 fluidly communicates with a crank chamber (not shown) inside the crankcase 96 (one crank chamber per cylinder 92) to supply lubricant to the crankshaft bearings (not shown) and the other components located therein. It should be understood that should the engine 24 have more or less cylinders 92, that the electronic oil pump 72 would have a number of outlets 84 and 86 that correspond to the number of cylinders. For example, should the engine 24 have three cylinders 92, then the electronic oil pump 72 would have three outlets 84 and three outlets 86. It is also contemplated that two electronic oil pumps 72 could be used should the number of outlets become too great for a single electronic oil pump 72. It is also contemplated that the electronic oil pump 72 could provide lubricant only to the cylinders 92 (via the crankcase 96) and that the exhaust valves 90 would be lubricated in some other way. In this case, an electronic oil pump 72' having only two outlets 86 (for an engine 24 having two cylinders 92) as shown in FIGS. 7 and 8 would be used. It is also contemplated that the electronic oil pump 72 could provide lubricant to other components and parts of the engine 24.

Figure 5:
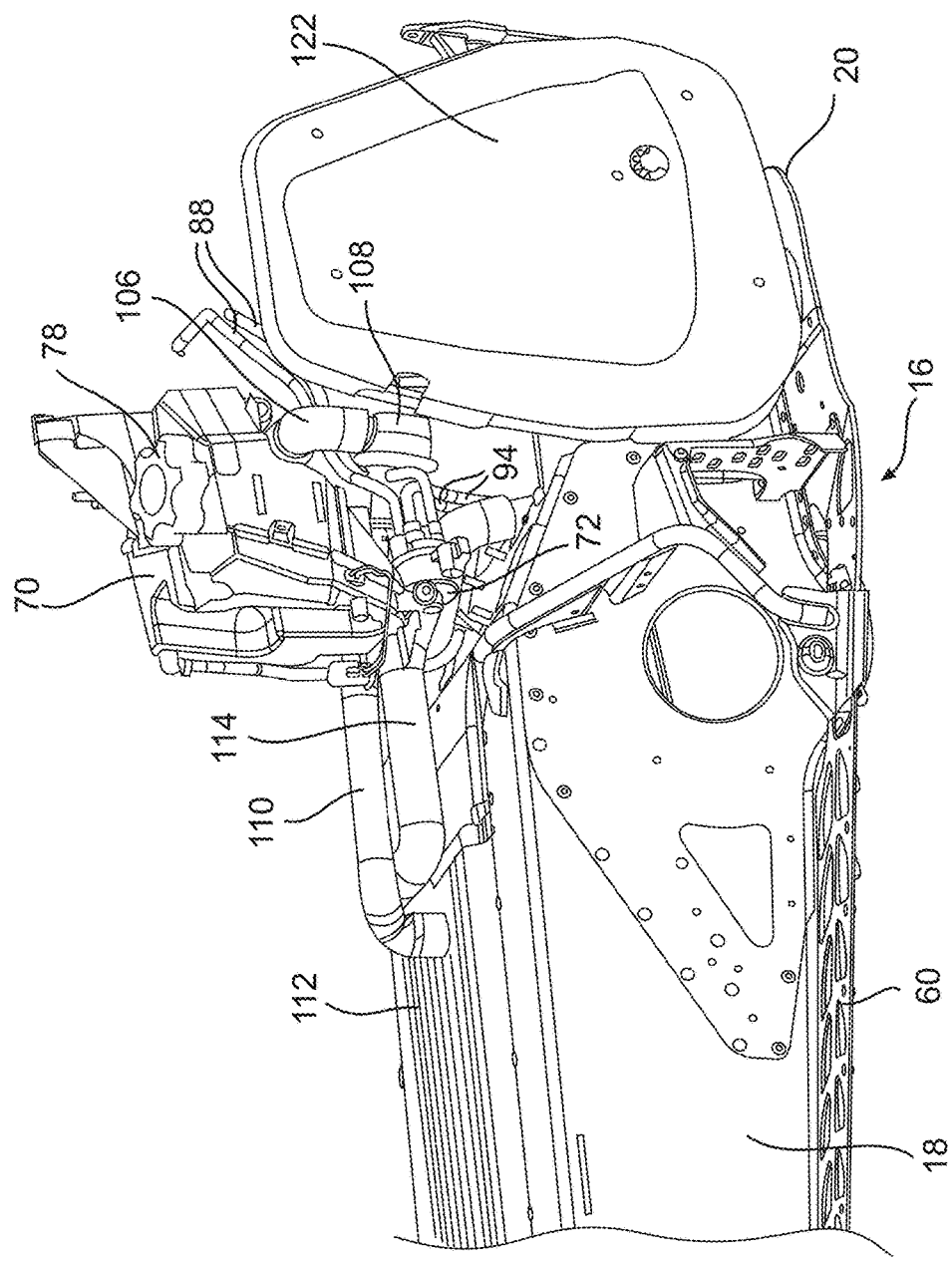
FIG. 5 is a perspective view from a rear, right side, of internal components of the snowmobile of FIG. 1, with some of the components removed for clarity.

Turning now to FIGS. 4 and 5, a cooling system, an exhaust system, and a positioning of the electronic oil pump 72 relative to these systems will be described. The cooling system has a coolant tank (not shown) that supplies coolant to the remainder of the system via pipe 98. Coolant can also flow back to the coolant tank via the pipe 98 when the coolant expands in the cooling system as the temperature of the coolant increase. Similarly, gas bubbles in the coolant system can flow to the coolant tank via pipe 98. Coolant in the system flows in coolant hose 100 to T-connector 102, and from T-connector 102 to coolant hose 104. From coolant hose 104, coolant enters coolant passages (not shown) inside the engine 24 thereby absorbing heat from the engine 24. The coolant then exits the engine 24 via coolant hose 106. From coolant hose 106, the coolant enters a thermostat 108. When the temperature of the coolant is below a predetermined temperature, the thermostat directs the coolant back to coolant hose 100, and from there the coolant is re-circulated through the engine 24 as described above. When the temperature of the coolant is above the predetermined temperature, the thermostat 108 prevents the coolant from entering coolant hose 100 and redirects the coolant to coolant hose 110. It is contemplated that the thermostat 108 could redirect only a portion of the coolant to coolant hose 110 and let a remainder of the coolant flow to coolant hose 100. From coolant hose 110, the coolant flows to a first heat exchanger 112 to be cooled. The first heat exchanger 112 forms the upper central part of the tunnel 18. From the first heat exchanger 112, the coolant flows to coolant hose 114. From coolant hose 114, the coolant flows to a second heat exchanger 116 (the majority of which is hidden by engine 24 in FIG. 4) located in the rear portion of the engine compartment 20 to be further cooled. It is contemplated that the first and second heat exchangers 112, 116 cooled be located elsewhere on the snowmobile 10 and that only one of the first and second heat exchangers 112, 116 could be used. From the second heat exchanger 116, coolant flows to coolant hose 118. From coolant hose 118, coolant flows to T-connector 102, to coolant hose 104, to the engine 24 to coolant hose 106 and back to thermostat 108 as described previously. The thermostat 108 causes the coolant to flow through the first and second heat exchangers 112, 116 until the temperature of the coolant is once again below the predetermined temperature.

The exhaust system receives exhaust gases from the exhaust ports 120 (FIG. 4) of the engine 24. The exhaust valves 90 regulate the flow of the exhaust gases through the exhaust ports 120. An exhaust manifold (not shown) is connected to the exhaust ports 120. The exhaust gases flow from the exhaust ports, through the exhaust manifold to a muffler 122 (FIG. 5). From the muffler 122 the exhaust gases flow through an exhaust pipe (not shown) to the atmosphere.

As can be seen in FIGS. 4 and 5, the electronic oil pump 72 is disposed in proximity to heat generating components of the snowmobile 10. These heat generating components include coolant hoses 110 and 114, heat exchanger 116, muffler 122, and engine 24. The coolant hoses 110 and 114, and heat exchanger 116 generate heat due to the hot coolant flowing through them. The muffler 122 generates heat due to the hot exhaust gases flowing through it. The engine 24 generates heat due to the combustion events taking place inside the cylinders 92. The electronic oil pump 72 is located proximate enough to these heat generating components that the heat generated by them, when the snowmobile 10 is in operation, heats up the lubricant contained in the electronic oil pump 72. Therefore, by being heated, the lubricant maintains a viscosity level that allows it to be easily pumped by the electronic oil pump 72. It is contemplated that locating the electronic oil pump 72 in proximity to at least one of these heat generating components could be sufficient to maintain the viscosity level of the lubricant in the electronic oil pump 72.

Figure 6:
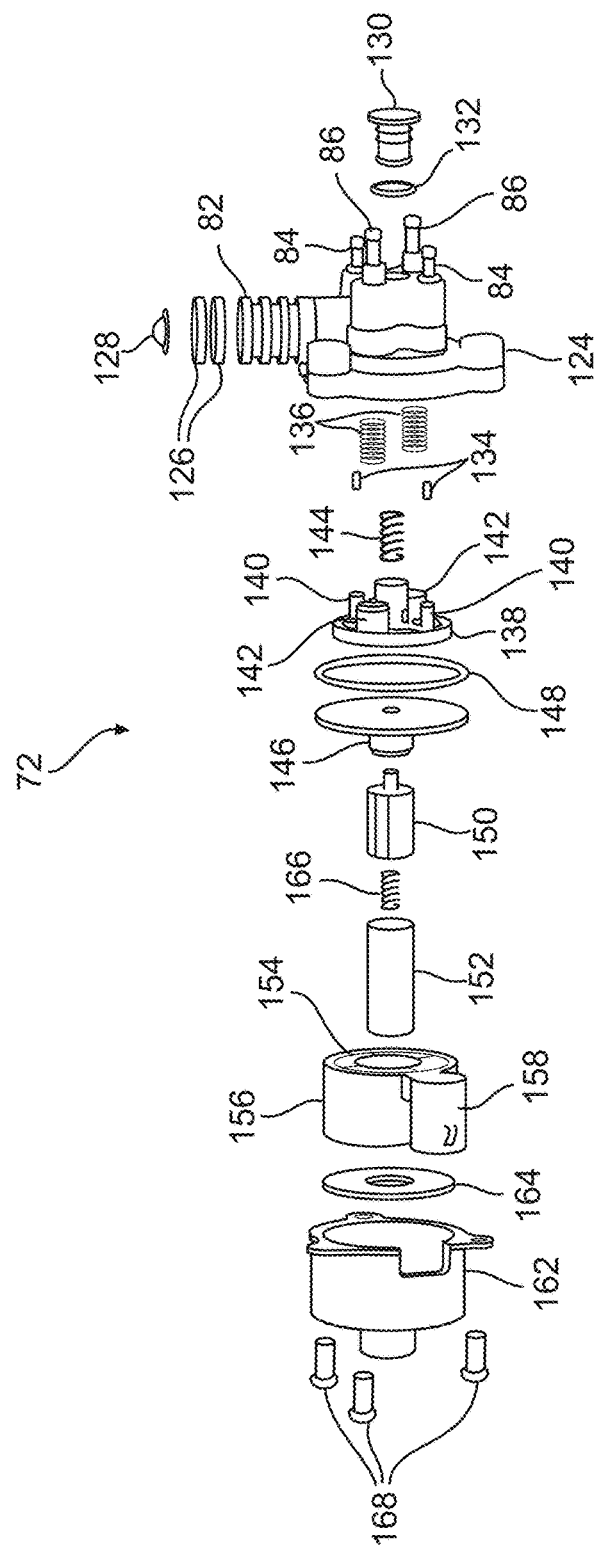
FIG. 6 is an exploded view of the electronic oil pump used in the assembly of FIG. 2.

Turning now to FIG. 6, details of the electronic oil pump 72 will be described. The electronic oil pump 72 is what is know as a reciprocating solenoid pump. The electronic oil pump 72 has a body 124 having the inlet 82 and the outlets 84, 86 integrally formed therewith. As can be seen, the outlets 86 are larger than the outlets 84. This is because more lubricant needs to be supplied to the cylinders 92 by the outlets 86 than needs to be supplied to the exhaust valves 90 by the outlets 84. Two O-rings 126 are provided around the outlet 82 to prevent lubricant present in the oil tank 70 to seal the connection between the outlet 82 and the oil tank 70. A filter 128 is disposed in the outlet 82 to prevent debris from entering the electronic oil pump 72. A stopper 130 is inserted in the body 124 centrally of the outlets 84, 86. An O-ring 132 disposed around the stopper 130 seals the connection between the stopper 130 and the body 124. Check valves 134 are disposed in the passage of the outlets 84 to prevent lubricant from entering the body 124 via the outlets 84. Similarly, check valves 136 are disposed in the passage of the outlets 86 to prevent lubricant from entering the body 124 via the outlets 86. The check valves 134, 136 are sized according to the size of their corresponding outlets 84, 86. A piston carrier 138 has four pistons 140, 142 thereon. As can be seen the pistons 142 are larger than the pistons 140. The pistons 142 are used to pump lubricant through the larger outlets 86, and the pistons 140 are used to pump lubricant through the smaller outlets 84. A spring 144 is disposed between the piston carrier 138 and the stopper 130. The piston carrier 138 is connected to a pole 146. An O-ring 148 is provided around the pole 146 to prevent lubricant present in the body 124 from leaking into the section of the electronic oil pump 72 that is opposite the side of the pole 146 where the piston carrier 138 is connected (i.e. to the left of the pole 146 in FIG. 6). An armature 150, made of magnetizable material such as iron, is connected to the pole 146. The armature 150 is slidably disposed inside a sleeve 152. The sleeve 152 is disposed in the center of a coil bobbin 154. The coil bobbin 154 has a coil 156 (shown in dashed lines in FIG. 6) wound around it. The ends of the coil 156 are connected to connector 158 which is used to connect the electronic oil pump 72 to the electronic control unit (ECU) 160 (FIG. 4). The coil bobbin 154 is disposed inside a solenoid housing 162. A washer 164 is disposed between the coil bobbin 154 and the end of the solenoid housing 162. A spring 166 is disposed between the armature 150 and the end of the solenoid housing 162. Three threaded fasteners 168 are used to fastened the solenoid housing 162 to the body 124. When the solenoid housing 162 is fastened to the body 124, all of the components shown therebetween in FIG. 6, except connector 158, are housed inside the volume created by the solenoid housing 162 and the body 124.

The electronic oil pump 72 operates as follows. Lubricant enters the body 124 via inlet 82. Current is applied to the coil 156 via the ECU 160, as will be described in greater detail below. The current applied to the coil 156 generates a magnetic field. The armature 150 slides towards the body 124 (to the right in FIG. 6) under the effect of the magnetic field. The pole 146 and the pistons 140, 142 move together with the armature 150. This movement of the armature also causes spring 144 to be compressed between the piston carrier 138 and the stopper 130. The movement of the pistons 140, 142 towards the body 124 compresses the lubricant contained in the body 124 and causes the lubricant to be expelled from the electronic oil pump 72 through the outlets 84, 86, via the check valves 134, 136. Once the lubricant has been expelled from the electronic oil pump 72, the ECU 160, after a certain time delay, stops applying current to the coil 156 which then no longer creates a magnetic field. Since the armature no longer applies a force to compress the spring 144, the spring 144 expands, thereby returning the pistons 140, 142, the pole 146, and the armature 150 to their initial positions (towards the left in FIG. 6). The spring 166 prevents the armature 150 from hitting the end of the solenoid housing 162, which would generate noise and potentially damage the armature 150, and counteracts the force of the spring 144 to place the armature 150 in the correct initial position. By returning to their initial positions, the pistons 140, 142 create a suction inside the body 124. The suction 124, along with gravity, causes more lubricant to flow inside the body 124 via the inlet 82. The check valves 134, 136 prevent the lubricant that was expelled from the electronic oil pump 72 from re-entering the body via outlets 84, 86. Once the armature 150 returns to its initial position, the ECU 160 applies current to the coil 156 and the cycle is repeated.

It is contemplated that other types of electronic oil pumps could be used. For example, a electronic rotary pump could be used. Alternatively, the armature 150 of the reciprocating electronic oil pump 72 described above could be replaced with a permanent magnet. In this embodiment, applying current in a first direction to the coil 156 causes movement of the permanent magnet, and therefore of the pistons 140, 142, in a first direction, and applying current in a second direction to the coil 156 causes movement of the permanent magnet in a second direction opposite the first one. Therefore, by being to control the movement of the permanent magnet in both direction, this type of pump provides additional control over the reciprocating motion of the pump when compared to the solenoid pump 72 described above.

Figure 9:
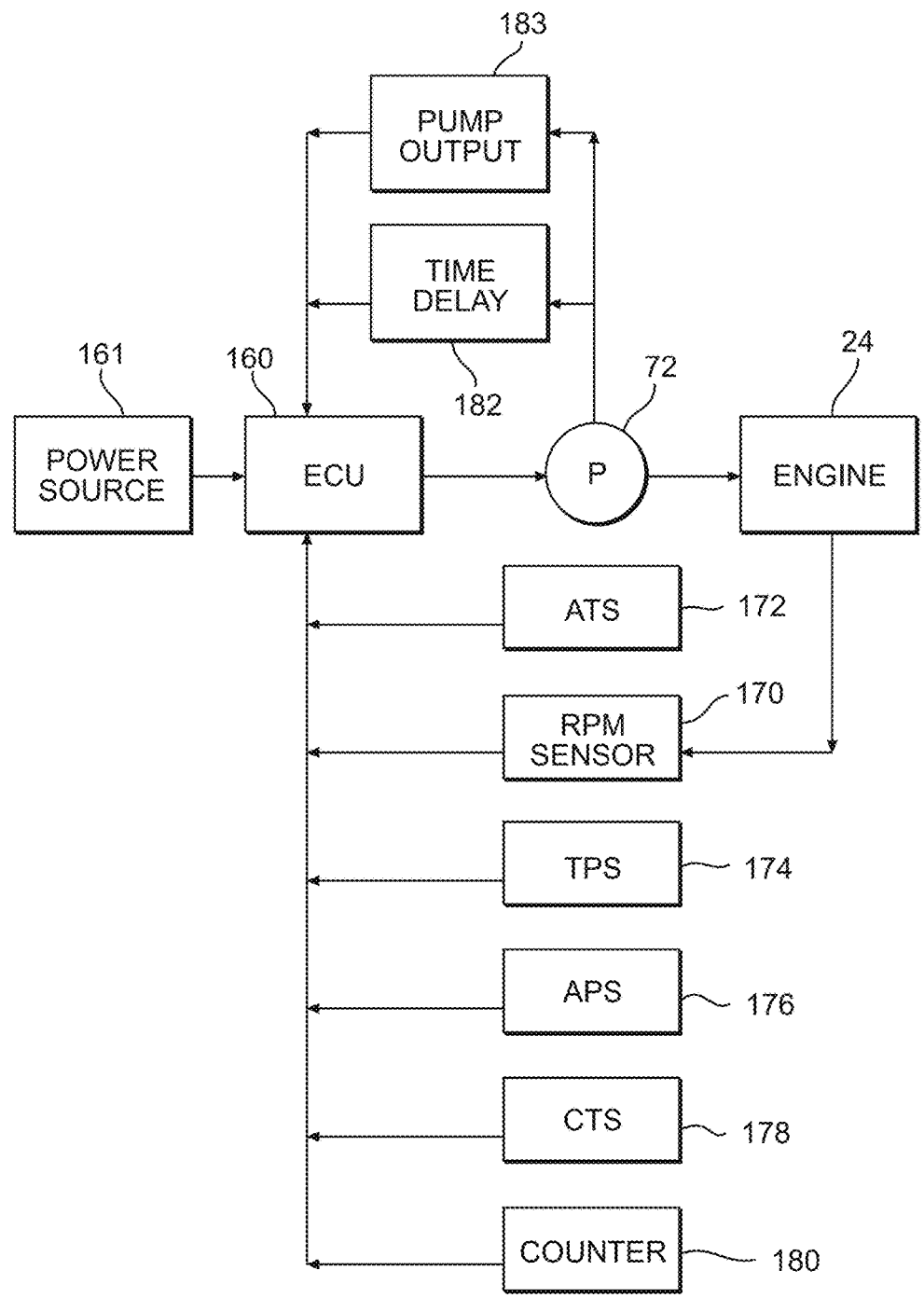
FIG. 9 is a schematic illustration of some of the various sensors and components present in the snowmobile of FIG. 1.

As described above, the ECU 160 is electrically connected to the connector 158 of the electronic oil pump 72 to supply current to the coil 156. The ECU 160 is connected to a power source 161 (FIG. 9) and, based on inputs from one or more of the various sensors described below with respect to FIG. 9, regulates when current from the power source 161 needs to be applied to the electronic oil pump 72 such that the proper amount of lubricant is supplied to the cylinders 92 of the engine 94. As seen in FIG. 9, an engine speed sensor (RPM sensor) 170 is connected to the engine 24 and is electrically connected to the ECU 160 to provide a signal indicative of engine speed to the ECU 160. The engine 24 has a toothed wheel (not shown) disposed on and rotating with a shaft of the engine 24, such as the crankshaft (not shown) or output shaft (not shown). The engine speed sensor 170 is located in proximity to the toothed wheel (see FIG. 4 for example) and sends a signal to the ECU 160 each time a tooth passes in front it. The ECU 160 then determines the engine rotation speed by calculating the time elapsed between each signal. An air temperature sensor (ATS) 172 is disposed in an air intake system of the engine 24, preferably in an air box (not shown), and is electrically connected to the ECU 160 to provide a signal indicative of the ambient air temperature to the ECU 160. A throttle position sensor (TPS) 174 is disposed adjacent a throttle body or carburetor (not shown), as the case may be, of the engine 24 and is electrically connected to the ECU 160 to provide a signal indicative of the position of the throttle plate inside the throttle body or carburetor to the ECU 160. An air pressure sensor (APS) 176 is disposed in an air intake system of the engine 24, preferably in an air box (not shown), and is electrically connected to the ECU 160 to provide a signal indicative of the ambient air pressure to the ECU 160. A coolant temperature sensor (CTS) 178 is disposed in the cooling system of the engine 24, preferably in one of coolant hoses 100, 104, or 106, and is electrically connected to the ECU 160 to provide a signal indicative of the temperature of the coolant to the ECU 160. It is contemplated that the CTS 178 could be integrated to the thermostat 108. A counter 180 is electrically connected to the ECU 160. The counter 180 can be in the form of a timer and provide a signal indicative of time to the ECU 160. The counter 180 could also count the number of times the electronic oil pump 72 has been actuated. The counter 180 could also be linked to the engine 24 to provide a signal indicative of the number of rotations of a shaft of the engine 24 to the ECU 160. It is contemplated that the RPM sensor 170 could integrate the function of the counter 180 to provide a signal indicative of the number of rotations of a shaft of the engine 24 to the ECU 160 in addition to the signal indicative of engine speed. It is also contemplated that there could be two (or more) counters 180, one acting as a timer, and the other counting the number of rotations of the engine 24 or the number of times the electronic oil pump 72 has been actuated. It is also contemplated that other sensors could be provide, such as for example an oil type sensor for sensing the type of lubricant placed in the oil tank 70.

The electronic oil pump 72 has an inherent time delay that is determined by an elapsed time from the time an electric current is received by the electronic oil pump 72 from the ECU 160 to the time that lubricant is actually initially expelled from the electronic oil pump 72. Due to manufacturing tolerances, this time delay varies from one electronic oil pump 72 to the other. Therefore, the electronic oil pump 72 has a specific time delay 182 associated therewith. The time delay 182 is stored on a computer readable storage medium, such as a bar code or a RFID tag, associated with the electronic oil pump 72. The time delay 182 is provided to the ECU 160 and is taken into account when regulating the application of current to the electronic oil pump 72 such that the actual operation of the electronic oil pump 72 corresponds to the desired operation of the electronic oil pump 72 as calculated by the ECU 160. An example as to how this is achieved for fuel injectors, and which could be adapted for use on electronic oil pumps, is described in U.S. Pat. No. 7,164,984, issued Jan. 16, 2007, the entirety of which is incorporated herein by reference.

Due to manufacturing tolerances, the amount of lubricant being expelled per stroke by the electronic oil pump 72 varies from one electronic oil pump 72 to the other. Therefore, the electronic oil pump 72 has a specific pump output 183 associated therewith that corresponds to the actual amount of lubricant being expelled per stroke by the electronic oil pump 72. The pump output 183 is stored on a computer readable storage medium, such as a bar code or a RFID tag, associated with the electronic oil pump 72. The computer readable storage medium could be the same as the one used for the time delay 182 or could be a different one. The pump output 183 is provided to the ECU 160 and is taken into account when regulating the application of current to the electronic oil pump 72 such that the actual operation of the electronic oil pump 72 corresponds to the desired operation of the electronic oil pump 72 as calculated by the ECU 160. It is contemplated that only one of the time delay 182 and the pump output 183 may be provided for the electronic oil pump 72.

Figure 10:
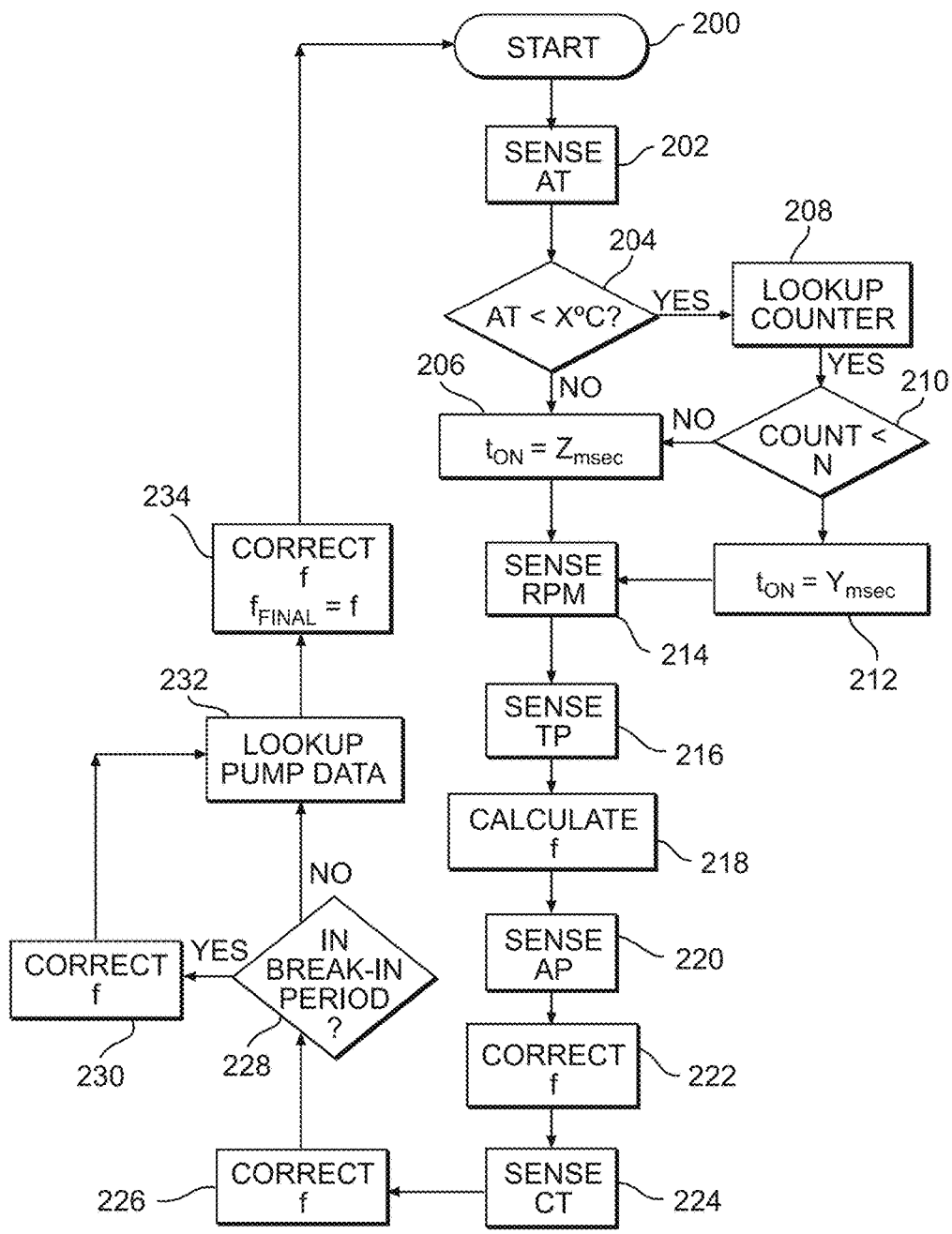
FIG. 10 is a logic diagram illustrating a control of the electronic oil pump.

Turning now to FIG. 10, a method of controlling the electronic oil pump 72 will be described. The method is initiated at step 200, once the ignition key (not shown) is inserted in the snowmobile 10 or once the engine 24 is started. The ambient air temperature (AT) is sensed at step 202 by the ATS 172 which sends a signal representative of the temperature to the ECU 160. At step 204, the ECU 160 compares the temperature sensed at step 202 to a predetermined temperature (X° C.) below which the increased viscosity of the lubricant (due to the low temperature) makes it difficult to initiate pumping. For example, the value of X° C. could be −30° C. It should be understood that the actual value of X° C. will depend on the properties of the lubricant being used. If the temperature is not less than X° C., then at step 206 the ECU 160 assigns a value of Z milliseconds to the length of time for which current is to be applied to the coil 156 during each pumping cycle ($t_{ON}$). If at step 204 it is determined that the temperature is less than X° C., then the ECU 160 looks at the value of the counter 180 at step 208. For the purposes of FIG. 10, the counter 180 counts the number of pumping cycles of the electronic oil pump 72. It should be understood that the other types of counters 180 described above could also be used. Then at step 210, the ECU 160 compares the count obtained from the counter 180 to a predetermined value N. If the value of the count at step 208 is not less than N, which means that electronic oil pump 72 has been operating for a certain period of time, then at step 206 the ECU 160 assigns a value of Z milliseconds to the length of time for which current is to be applied to the coil 156 during each pumping cycle. If the value of the count at step 208 is less than N, which means that operation of the electronic oil pump 72 has just begun, then at step 212 the ECU 160 assigns a value of Y milliseconds to the length of time for which current is to be applied to the coil 156 during each pumping cycle. The value of Y is greater than the value of Z. This is because when the temperature is below the value X (step 204) and pump operation has just begun (or is about to begin) (step 210), then the lubricant present in the electronic oil pump 72 needs to be heated in order to reduce its viscosity and facilitate pumping thereof. By applying current to the coil 156 for a longer period of time (Y milliseconds) than would normally be used (Z milliseconds), the coil 156 generates more heat than it normally would and therefore heats up the lubricant. Once pumping of the lubricant has been initiated for a certain number of pumping cycles, then the length of time for which current is to be applied to the coil 156 during each pumping cycle can be changed to the shorter period of time of Z milliseconds even though the air temperature is still low (step 206 from step 210). This is because once lubricant starts flowing through the electronic oil pump 72 it becomes easier to pump even though its viscosity may be higher than usual. This is also because when the electronic oil pump 72 has been operating for a certain period of time, then the other components of the snowmobile 10 have also been operating for a certain period of time, which means that the heat generating components previously described now generate sufficient heat to heat the lubricant present in the electronic oil pump 72. Finally, the longer period of time (Y milliseconds) for which current is to be applied to the coil 156 during each pumping cycle is only used for the first few cycles of the electronic oil pump 72 because it requires more energy (i.e. current applied longer) than is required for the majority of the cycles, and because operating the electronic oil pump 72 in this manner over a long period of time could generate sufficient heat to damage the components of the electronic oil pump 72.

Figure 11:
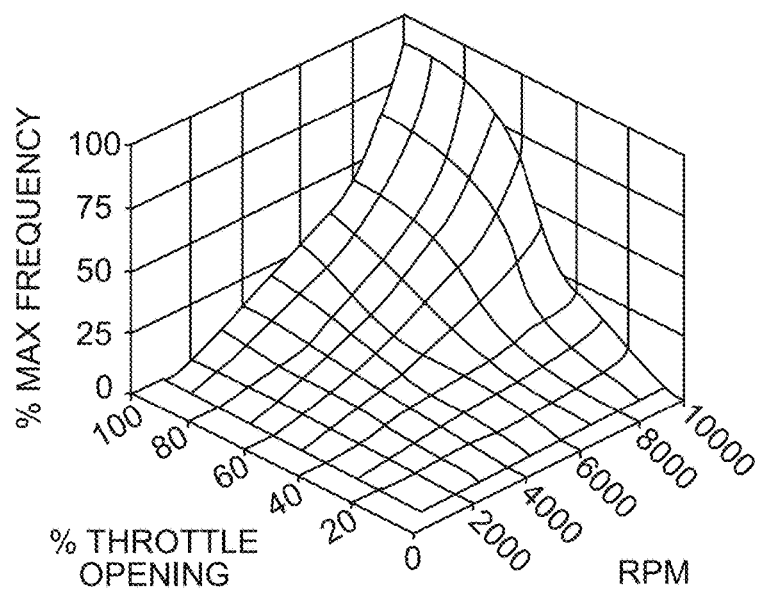
FIG. 11 is a graph illustrating the relationship between the frequency of operation of the electronic oil pump, engine speed, and throttle opening.

Once the length of time for which current is to be applied to the coil 156 during each pumping cycle has been determined at step 206 or 212, as the case may be, then the ECU 160 determines the frequency (f) at which the electronic oil pump 72 is to be operated. Since the amount of time for which current is to be applied is known, by determining the frequency, the amount of time for which current is not to be applied can easily be determined. To determine the frequency, the speed of the engine 24 is first sensed at step 214 by the RPM sensor 170 which sends a signal representative of the engine speed to the ECU 160. The throttle position (TP) is then sensed at step 216 by the TPS 174 which sends a signal representative of the throttle position to the ECU 160. Based on the signals received from the RPM sensor 170 and TPS 174, the ECU 160 calculates, at step 218, a first frequency as a function of engine speed and throttle position. This function is non-linear with respect to engine speed and throttle position as illustrated in FIG. 11. Note that FIG. 11 is for illustrative purposes only and that the actual relationship between frequency, engine speed, and throttle position will vary from one type of engine to the other. Then, at step 220, ambient air pressure (AP) is sensed by the APS 176 which sends a signal representative of air pressure to the ECU 160. Based on the signal received by the APS 176, the ECU 160 applies at step 222 a correction factor to the frequency calculated at step 218. If the air pressure is low (high altitude), then the frequency is decreased since less lubricant is necessary in these conditions. If the air pressure is high (low altitude), then the frequency is increased since more lubricant is necessary in these conditions. Then, at step 224, coolant temperature (CT) is sensed by the CTS 178 which sends a signal representative of coolant temperature to the ECU 160. Based on the signal received by the CTS 176, the ECU 160 applies at step 226 a correction factor to the frequency calculated at step 222. If the coolant temperature is high, then the frequency is increased since more lubricant is necessary in these conditions. If the coolant temperature is low, then the frequency is decreased since less lubricant is necessary in these conditions. The at step 228, the ECU 160 determines whether the engine 24 is still in its "break-in" period. The break-in period is the period during which a new engine 24 should not be operated at full capacity. This period can correspond to a certain number of hours of operation, a certain number of kilometres traveled by the snowmobile 10, or a certain number of engine revolutions. During the break-in period, more lubricant also needs to be supplied to the engine 24 to properly lubricate the components therein. Therefore if at step 228 it is determined that the engine is in its break-in period, the ECU 160 applies at step 230 a correction factor to increase the frequency calculated at step 226 and then goes to step 232. If at step 228 it is determined that the engine is not in its break-in period, the ECU 160 then moves directly to step 232. The latest frequency that has been calculated before step 232, at step 230 or 226 as the case may be, corresponds to the desired frequency of operation of the electronic oil pump 72. As described above, the electronic oil pump 72 has data associated therewith to take into account the inherent time delay 182 in its operation and/or the actual amount of lubricant being expelled per stroke (pump output 183). Therefore, at step 232, the ECU 160 looks up the pump data (i.e. time delay 182 and/or pump output 183) of the electronic oil pump 72 and corrects the desired frequency accordingly at step 234. The frequency calculated at step 234 corresponds to the frequency at which the ECU 160 applies current to the coil 156 ($f_{Final}$) for a certain period of time (Y or Z milliseconds) such that the pump operates at the desired frequency (calculated at steps 226 or 230). From step 234, the ECU 160 returns to step 202 and repeats the steps described above. The amount of correction necessary at steps 222, 226, and 230 is based on lookup tables stored in the ECU 160 or a separate electronic storage medium accessible by the ECU 160. It is contemplated that rather than applying a correction factor at steps 222, 226, and 230, that steps 220, 224, 228, and 232 could occur between steps 216 and 218, such that at step 218 the ECU 160 could calculate the frequency as a function of a plurality of the signals received by the ECU 160, thus eliminating the need for steps 222, 226, 230, and 234.

Figure 12:
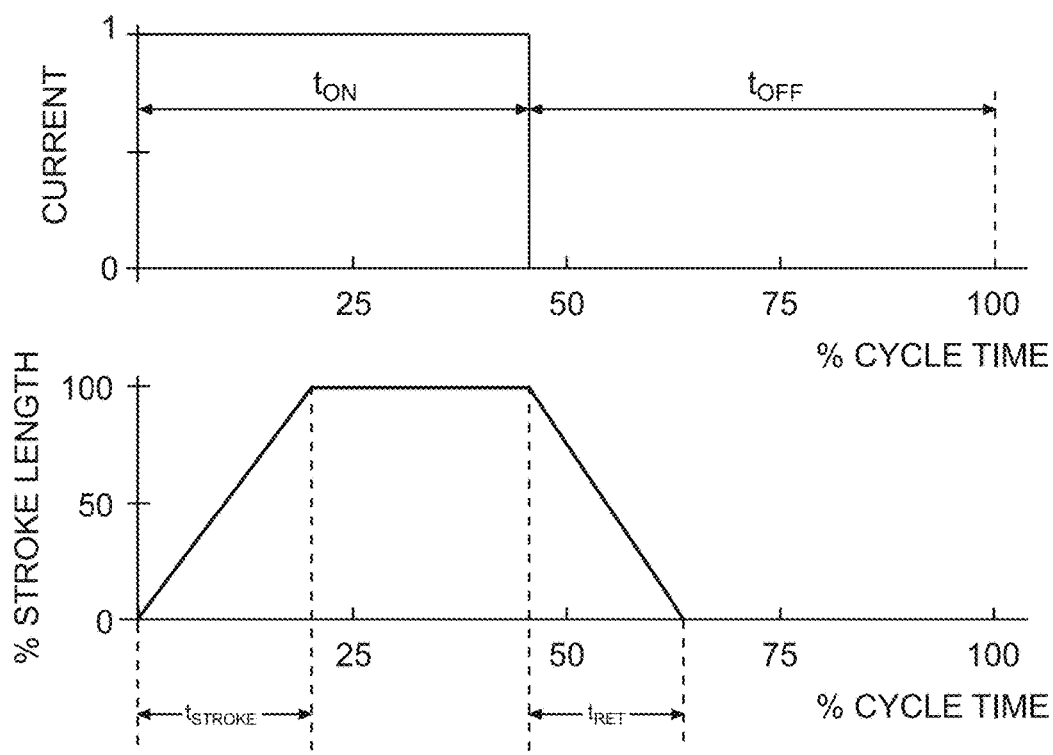
FIG. 12 is a pair of graphs illustrating the relationship between the current being applied to the electronic oil pump, the position of the pump piston, and time.

Turning now to FIG. 12, a relationship between the current being applied to the electromagnetic coil 156 of electronic oil pump 72, the position of the pump pistons 140, 142, and time will be described. This relationship will be described with respect to one cycle of operation of the electronic oil pump 72 The cycle time (or the time it takes to complete one cycle) is the time from the beginning of one stroke of the pistons 140, 142 to the beginning of the next stroke of the pistons 140, 142. At the beginning of the cycle, the electromagnetic coil 156 is connected to the power source 161 by the ECU 160, current applied to the electromagnetic coil 156. This causes the pistons 140, 142 to move towards the body 124 of the electronic oil pump 72. The time it takes the pistons 140, 142 to move from their initial position (0% stroke length) to the maximum position they can reach (100% stroke length) is known as the stroke time ($t_{STROKE}$). As can be seen in FIG. 12, the period of time for which current is being applied to the electromagnetic coil 156 ($t_{ON}$) is longer than the stroke time. This extra amount of time permits the lubricant in the electronic oil pump 72 to be heated by the heat generated by the electromagnetic coil 156. During this extra amount of time, the pistons remain in the same position. The electromagnetic coil 156 is then disconnected from the power source 161 by the ECU 160, such that current is not applied to the electromagnetic coil 156 for a remainder of the cycle ($t_{OFF}$). This causes the pistons 140, 142 to return to their initial position (0% stroke length). The time it takes the pistons 140, 142 to return to their initial position (0% stroke length) is known as the return time ($t_{RET}$). The pistons 140, 142 then remain in their initial position until the beginning of the next cycle. The way in which $t_{ON}$ is calculated is described in more detail below, however, in order to maintain proper pump operation, $t_{ON}$ is longer than the stroke time but is preferably less than or equal to the cycle time minus the return time. The stroke and return times will depend of the length of the stroke, the force of the springs 144, 166, the strength of the magnetic field generated by the electromagnetic coil 156, and the viscosity of the lubricant being pumped (which varies with temperature) and are generally determined experimentally.

Figure 13A:
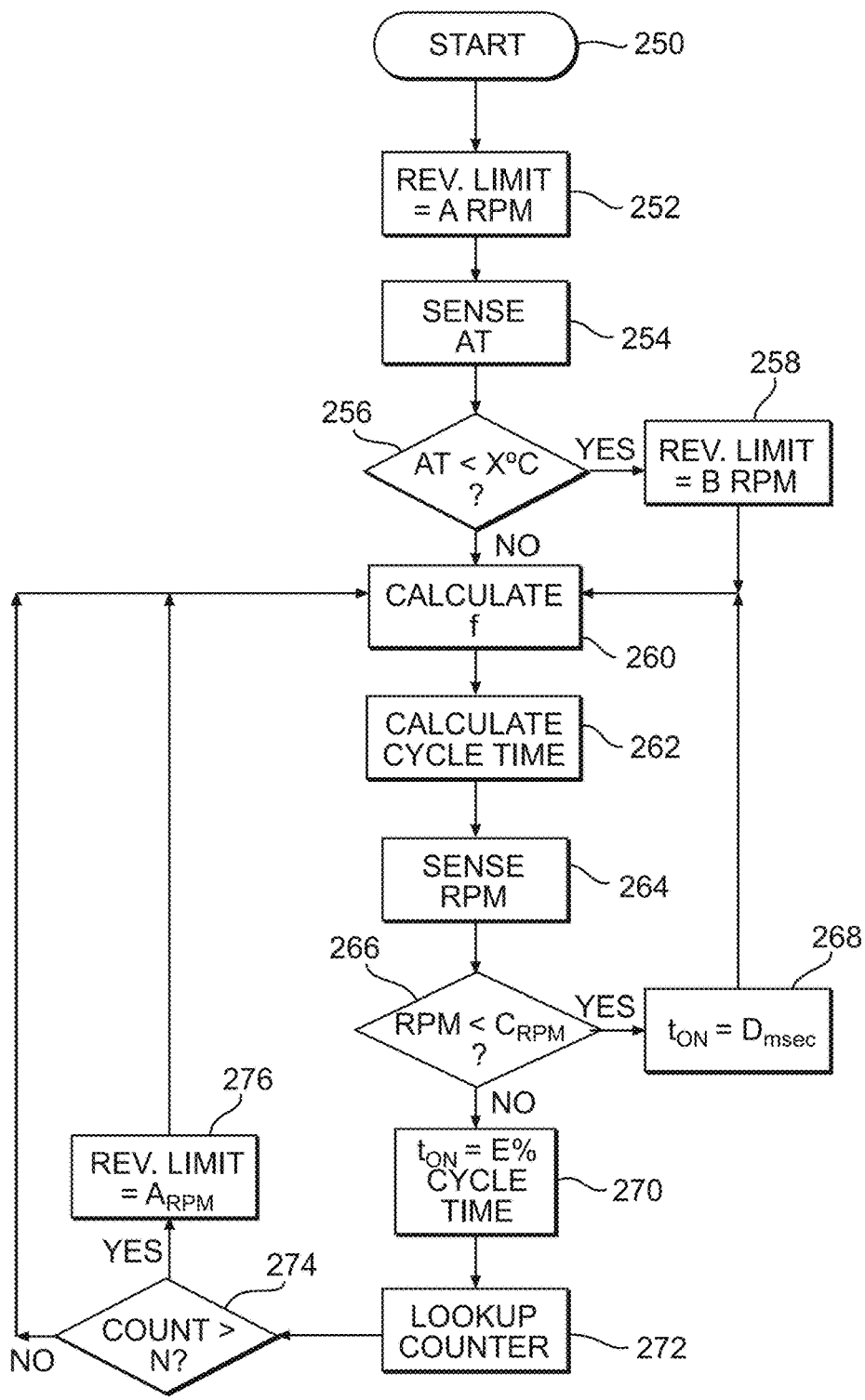
FIG. 13A is a logic diagram illustrating an alternative control of the electronic oil pump.

Turning now to FIG. 13A, an alternative method of controlling the electronic oil pump 72 will be described. The method is initiated at step 250, once the ignition key (not shown) is inserted in the snowmobile 10 or once the engine 24 is started. At step 252, the ECU 160 limits the maximum engine speed to a value of A RPM, which corresponds to an engine speed limit during normal operation. The ambient air temperature (AT) is sensed at step 254 by the ATS 172 which sends a signal representative of the temperature to the ECU 160. At step 256, the ECU 160 compares the temperature sensed at step 254 to a predetermined temperature (X° C.) below which the increased viscosity of the lubricant (due to the low temperature) makes it difficult to initiate pumping. For example, the value of X° C. could be −30° C. It should be understood that the actual value of X° C. will depend on the properties of the lubricant being used. If the temperature is less than X° C., then at step 258 the ECU 160 limits the maximum engine speed to a value of B RPM which is less than the engine speed limit during normal operation (A RPM). This is because the increased viscosity of the lubricant at low temperatures would not permit the electronic oil pump 72 to operate at a high enough frequency to supply lubricant to the engine if it were to operate above B RPM. From step 258, the method then proceeds to step 260. If at step 256 it is determined that the temperature is not less than X° C., then the method proceeds directly to step 260. At step 260, the frequency (f) of operation of the electronic oil pump 72 is calculated. For example, the frequency could be calculated as in steps 214 to 234 of FIG. 10 described above, but it should be understood that other ways of calculating the frequency could be used. Then at step 262, the cycle time is calculated based on the frequency calculated at step 260. As would be understood by those skilled in the art, the cycle time (in seconds) is equal to one divided by the frequency (in Hz). It is contemplated that instead calculating the cycle time by converting the frequency, that step 260 could be omitted and that the cycle time could be determined directly. Then at step 264, the speed of the engine 24 is sensed by the RPM sensor 170 which sends a signal representative of the engine speed to the ECU 160. At step 266, the ECU 160 compares the engine speed sensed at step 264 to a predetermined engine speed (C RPM), which is less than both A and B RPM. C RPM preferably corresponds to an idle speed of the engine 24. If at step 266 it is determined that the engine speed sensed at step 264 is less than C RPM, the $t_{ON}$ to be applied to the electromagnetic coil 156 is set to a constant amount of time (D msec). The value of D is selected such that the $t_{ON}$ is longer than the stroke time of the electronic oil pump 72 regardless of the required frequency of operation below C RPM in order to heat the lubricant but that is sufficiently short that the power source 161 can supply sufficient current to the electromagnetic coil 156 to properly operate the electronic oil pump 72. This is because, in a preferred embodiment, the power source 161 includes an alternator and the amount of power generated by the alternator is proportional to the engine speed. Therefore, having a $t_{ON}$ that is too long at engine speed below C RPM would deplete the power source and affect the operation of the electronic oil pump 72. From step 268, the method returns to step 260. If at step 266 it is determined that the engine speed sensed at step 264 is not less than C RPM, the $t_{ON}$ to be applied to the electromagnetic coil 156 is set to equal a percentage (E %) of the cycle time calculated at step 262. This percentage of the cycle time is selected such that $t_{ON}$ is longer than the stroke time but is less than or equal to the cycle time minus the return time. E % is preferably between 30 and 50 percent of the cycle time. In a preferred embodiment, E % is about 40 percent of the cycle time. Following step 270, the ECU 160 looks at the value of the counter 180 at step 272. For the purposes of FIG. 13A, the counter 180 counts the time for which the engine 24 has been operating above or at C RPM. It should be understood that the other types of counters 180 described above could also be used. Then at step 274, the ECU 160 compares the count obtained from the counter 180 to a predetermined value N. If the value of the count at step 274 is greater than N, which means that electronic oil pump 72 has been operating for a certain period of time above C RPM, then at step 276 the ECU 160 limits the maximum engine speed to the value of A RPM described above. Therefore, if the maximum engine speed was previously limited to B RPM at step 258, it will now be increased to be limited to A RPM. This is because by this time the lubricant has been sufficiently heated that the electronic oil pump 72 can be operated at the frequency necessary to supply sufficient lubricant to the engine 24 operating at A RPM. From step 276, the method returns to step 260. If the value of the count at step 274 is not greater than N, the method returns to step 260, and the engine speed continues to be limited to its previous limit of A or B RPM as the case may be.

Figure 13B:
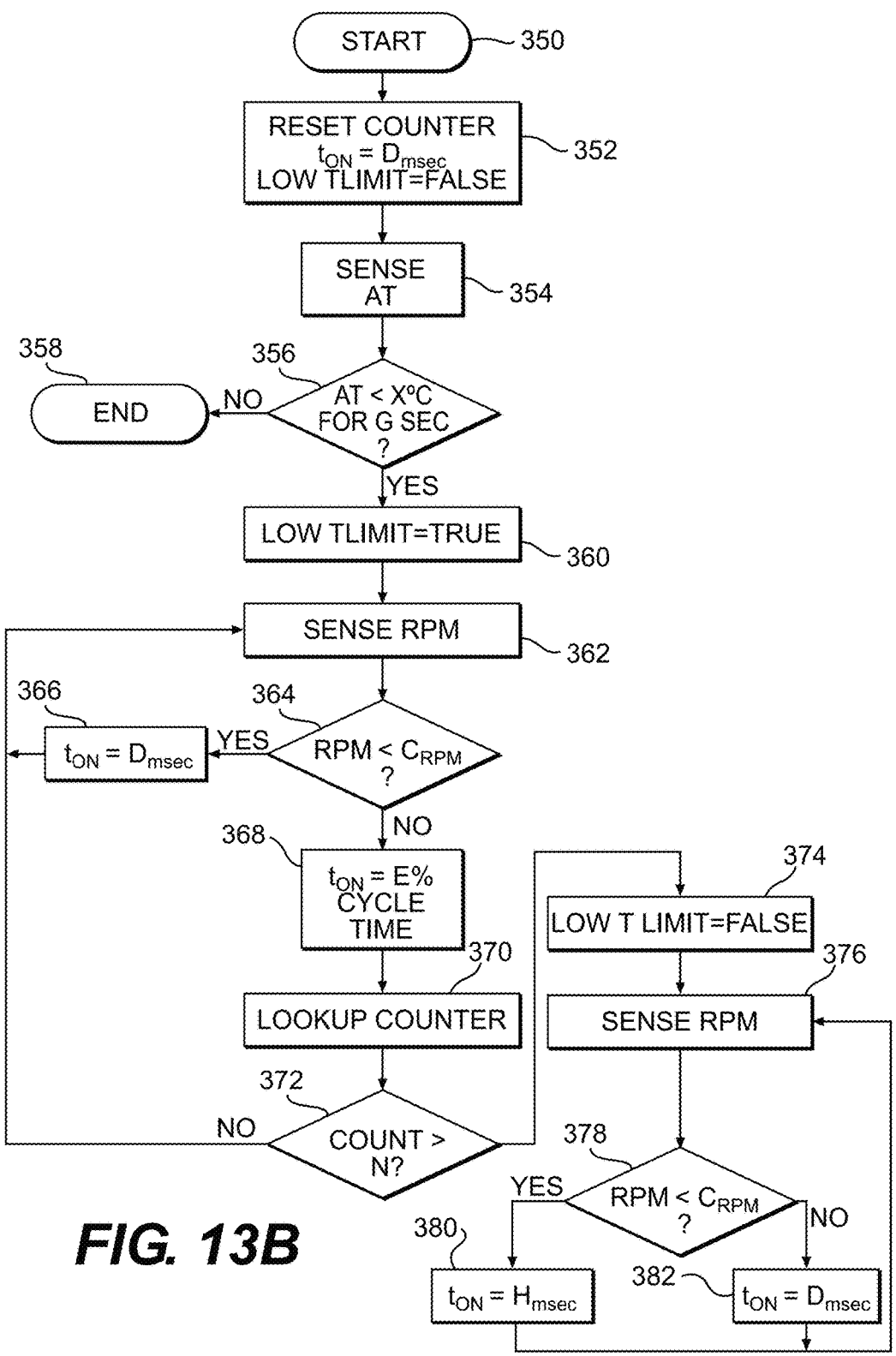
FIG. 13B is a logic diagram illustrating another alternative control of the electronic oil pump.

Turning now to FIG. 13B, another alternative method of controlling the electronic oil pump 72 will be described. Throughout this method, the frequency (f) of operation of the electronic oil pump 72 is being calculated, as in steps 214 to 234 of FIG. 10 described above for example, but it should be understood that other ways of calculating the frequency could be used. The cycle time is calculated based on the calculated frequency. It is contemplated that instead calculating the cycle time by converting the frequency, that the cycle time could be determined directly. The method is initiated at step 350, once the ignition key (not shown) is inserted in the snowmobile 10 or once the engine 24 is started. At step 352, the ECU 160 resets the counter 180, in this case a time counter, to zero and initiates it, sets the $t_{ON}$ to be applied to the electromagnetic coil 156 to be a constant amount of time (D msec). The value of D is selected such that the $t_{ON}$ is longer than the stroke time of the electronic oil pump 72 at engine start-up. Also at step 352, the ECU 160 turns off a low temperature function (LowTLimit), described in greater detail below. The ambient air temperature (AT) is sensed at step 354 by the ATS 172 which sends a signal representative of the temperature to the ECU 160. At step 356, the ECU 160 determines if at any time during a period of G seconds the temperature sensed at step 354 is below a predetermined temperature (X° C.) below which the increased viscosity of the lubricant (due to the low temperature) makes it difficult to initiate pumping. For example, the value of X° C. could be −30° C. It should be understood that the actual value of X° C. will depend on the properties of the lubricant being used. If the temperature is greater than or equal to X° C. during the first G seconds of operation of the engine 24, the method ends at step 358 and normal operation of the oil pump resumes (for example, as in steps 376 to 382 described below). If the temperature at any point during the first G seconds of operation of the engine 24 is less than X° C., then at step 360 the ECU 160 turns on a low temperature function (LowTLimit). When the low temperature function is on, the ECU 160 controls the engine 24 so as to limit the maximum degree of opening of the exhaust valves, limits the maximum engine speed to a value which is less than the engine speed limit during normal operation, and sends a signal to a display cluster (not shown) of the snowmobile 10 such that the display cluster provides an indication to the driver of the snowmobile 10 that the low temperature function is activated. The engine speed is limited because the increased viscosity of the lubricant at low temperatures would not permit the electronic oil pump 72 to operate at a high enough frequency to supply lubricant to the engine if it were to operate at high speeds. From step 360, the method then proceeds to step 362 where the speed of the engine 24 is sensed by the RPM sensor 170 which sends a signal representative of the engine speed to the ECU 160. At step 364, the ECU 160 compares the engine speed sensed at step 362 to a predetermined engine speed (C RPM). C RPM preferably corresponds to an idle speed of the engine 24. If at step 364 it is determined that the engine speed sensed at step 362 is less than or equal to C RPM, the $t_{ON}$ to be applied to the electromagnetic coil 156 is set to a constant amount of time (D msec) at step 366. The value of D is selected such that the $t_{ON}$ is longer than the stroke time of the electronic oil pump 72 regardless of the required frequency of operation below or at C RPM in order to heat the lubricant but that is sufficiently short that the power source 161 can supply sufficient current to the electromagnetic coil 156 to properly operate the electronic oil pump 72. From step 366, the method returns to step 362. If at step 364 it is determined that the engine speed sensed at step 362 is greater than C RPM, the $t_{ON}$ to be applied to the electromagnetic coil 156 is set to equal a percentage (E %) of the cycle time at step 368. This percentage of the cycle time is selected such that $t_{ON}$ is longer than the stroke time but is less than or equal to the cycle time minus the return time. E % is preferably between 30 and 50 percent of the cycle time. In a preferred embodiment, E % is about 40 percent of the cycle time. Following step 368, the ECU 160 looks at the value of the counter 180 at step 370. For the purposes of FIG. 13B, the counter 180 counts the time for which the engine 24 has been operating above C RPM. It should be understood that the other types of counters 180 described above could also be used. Then at step 372, the ECU 160 compares the count obtained from the counter 180 to a predetermined value N. If the value of the count at step 372 is not greater than N, the method returns to step 362. If the value of the count at step 372 is greater than N, which means that electronic oil pump 72 has been operating for a certain period of time above C RPM, then at step 374 the ECU 160 turns off the low temperature function. This means that the maximum degree of opening of the exhaust valves is no longer limited, that the maximum engine speed to a value is back to the engine speed limit during normal operation, and that the display cluster no longer provides an indication to the driver of the snowmobile 10 that the low temperature function is activated (or provides an indication that it is not activated). This is because by this time the lubricant has been sufficiently heated that the electronic oil pump 72 can be operated at the frequency necessary to supply sufficient lubricant to the engine 24 operating at any engine speed. From step 374, the method proceeds to step 376 where the ECU 160 compares the engine speed sensed at step 376 to the predetermined engine speed (C RPM). If at step 378 it is determined that the engine speed sensed at step 376 is less than or equal to C RPM, the $t_{ON}$ to be applied to the electromagnetic coil 156 is set to the constant amount of time of D msec at step 382. If at step 378 it is determined that the engine speed sensed at step 376 is greater than C RPM, the $t_{ON}$ to be applied to the electromagnetic coil 156 is set to a constant amount of time of H msec which is greater than D msec at step 380. From steps 380 and 382, the method returns to step 376 and repeats steps 376 to 382 until the engine 24 is stopped.

Figure 14:
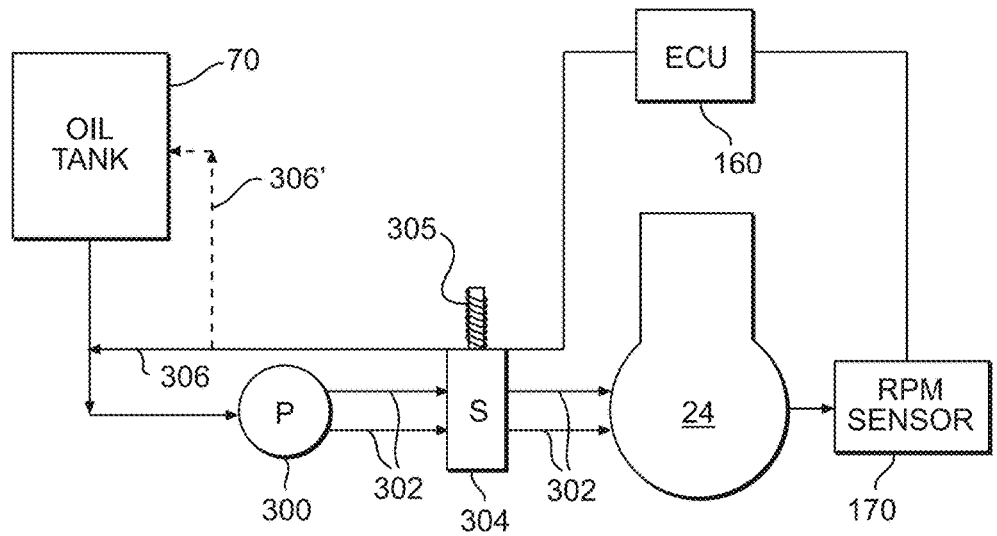
FIG. 14 is a schematic illustration of an alternative embodiment of a lubrication system to be used in the snowmobile of FIG. 1.
Figure 15:
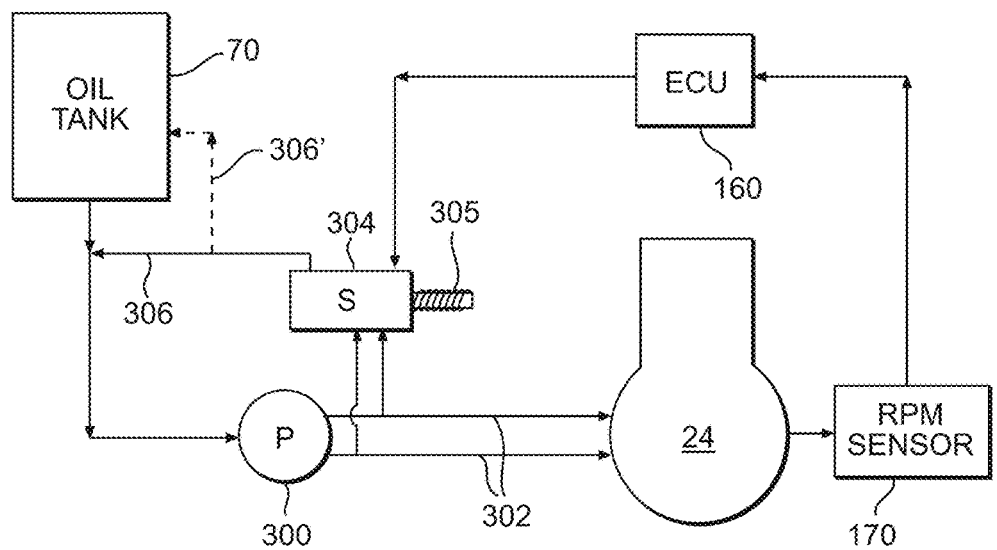
FIG. 15 is a schematic illustration of another alternative embodiment of a lubrication system to be used in the snowmobile of FIG. 1.

Turning now to FIGS. 14 and 15, alternative embodiments of a lubrication system to be used in the snowmobile 10 will be described. The lubrication systems in FIGS. 14 and 15 both include an oil tank 70, an oil pump 300 fluidly connected to the oil tank 70 for supplying lubricant to the engine 24 via oil lines 302, and an electronic valve 304 fluidly connected to the oil lines 302 downstream of the oil pump 300. The number of oil lines 302 preferably corresponds to the number of cylinders of the engine 24, in this case two. The oil pump 300 is preferably a mechanical oil pump driven by the engine 24 as is known in the prior art. It is contemplated that an electronic oil pump and other types of pumps could also be used. The electronic valve 304 preferably includes an electromagnetic coil 305 to which current can be applied to actuate the valve 304. The electronic valve 304 controls the amount of lubricant being supplied to the engine 24 by redirecting excess lubricant being supplied by the oil pump 300 to an oil by-pass line 306. The oil by-pass line 306 returns the lubricant therein upstream of the oil pump 300 as shown. Alternatively, the oil by-pass line 306 could return the lubricant therein back to the oil tank 70 (see line 306' in FIGS. 14 and 15). The ECU 160 determines the amount of lubricant that needs to be redirected based at least in part from a signal received from the RPM sensor 170. The ECU 160, which is electrically connected to the electronic valve 304, then applies current from a power source to the electronic valve 304 to adjust the valve's position accordingly. The ECU 160 controls movement of the electronic valve between one or more positions where at least a portion of the lubricant flowing in the oil lines 302 is returned to the oil pump 300 via the by-pass oil line 306 and a position where the lubricant flowing in the oil lines 302 is completely delivered to the engine 24. It is contemplated that the ECU 160 could also determine the amount of lubricant that needs to be redirected to the oil by-pass line 306 in a manner similar to the way in which the frequency of operation of the electronic oil pump 72 was determined in FIG. 10 above. In the embodiment shown in FIG. 14, the electronic oil valve 304 is disposed in series with the oil lines 302. In the embodiment shown in FIG. 15, the electronic oil valve 304 is disposed in parallel with the oil lines 302. It is contemplated that one electronic oil valve 304 could be provided for each oil line 302.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snowmobile comprising:
a frame, the frame including:
an engine compartment; and
a tunnel rearward of the engine compartment;
an endless drive track disposed below the tunnel for propelling the snowmobile;
a pair of skis operatively connected to the frame;
an engine disposed in the engine compartment, the engine being operatively connected to the endless drive track, the engine comprising:
a pair of cylinders;
a crankcase connected to the pair of cylinders; and
a pair of exhaust valves connected to the pair of cylinders;
an electronic oil pump having an inlet, the electronic oil pump fluidly communicating with the crankcase and the pair of exhaust valves, the electronic oil pump having a pair of outlets, each one of the pair of outlets fluidly communicating with a corresponding one of the pair of exhaust valves;
an oil tank fluidly communicating with the inlet of the electronic oil pump for supplying oil to the electronic oil pump, the electronic oil pump delivering oil from the oil tank to the crankcase and the pair of exhaust valves; and
an electronic control unit (ECU) electrically connected to the electronic oil pump for controlling actuation of the electronic oil pump.

2. The snowmobile of claim 1, wherein:
the engine further comprises a crankshaft supported by at least one crankshaft bearing; and
the electronic oil pump fluidly communicates with the at least one crankshaft bearing to supply oil to the at least one crankshaft bearing.

3. The snowmobile of claim 1, wherein:
the pair of outlets is a first pair of outlets; and
the electronic oil pump has a second pair of outlets, each one of the second pair of outlets fluidly communicates with a corresponding one of the pair of cylinders.

4. The snowmobile of claim 3, wherein each outlet of the second pair of outlets is larger than each outlet of the first pair of outlets such that more oil is supplied to the pair of cylinders than to the pair of exhaust valves.

5. The snowmobile of claim 1, further comprising a muffler fluidly communicating with at least one exhaust port of the engine, the muffler being disposed to one side of the electronic oil pump, and the electronic oil pump being disposed between the engine and the muffler.

6. The snowmobile of claim 5, further comprising a hood and side panels enclosing the engine; and
wherein the muffler and the electronic oil pump are disposed in an enclosure defined by the hood and the side panels.

7. The snowmobile of claim 1, further comprising a straddle seat connected to the frame; and
wherein the straddle seat is disposed rearward of the electronic oil pump.

8. The snowmobile of claim 1, wherein the oil tank is disposed in the engine compartment.

9. The snowmobile of claim 1, wherein the oil tank is connected to the frame, and the oil tank is disposed behind the engine.

10. The snowmobile of claim 1, wherein a portion of the oil tank is translucent to permit inspection as to a level of lubricant in the oil tank.

11. The snowmobile of claim 1, further comprising an engine speed sensor connected to the engine, the engine speed sensor being electrically connected to the ECU for transmitting a signal representative of engine speed to the ECU;
wherein the ECU controls the actuation of the electronic oil pump based at least in part on the signal representative of engine speed.

12. The snowmobile of claim 1, further comprising at least one heat generating component;
   wherein the electronic oil pump is disposed in proximity to the at least one heat generating component;
   wherein the at least one heat generating component comprises at least one of:
      a muffler fluidly communicating with at least one exhaust port of the engine;
      a coolant hose fluidly communicating with a cooling system of the engine; and
      a heat exchanger fluidly communicating with a cooling system of the engine.

13. The snowmobile of claim 12, wherein the electronic oil pump is disposed in proximity to the muffler, the coolant hose, and the heat exchanger.

14. The snowmobile of claim 12, wherein the electronic oil pump is disposed in proximity to the engine.

15. The snowmobile of claim 1, wherein the electronic oil pump includes a coil.

16. The snowmobile of claim 1, wherein:
   the electronic oil pump has at least one outlet angled relative to the inlet of the electronic oil pump; and
   the electronic oil pump is disposed externally of the oil tank and is connected directly to an outlet of the oil tank below the outlet of the oil tank.

17. The snowmobile of claim 1, wherein oil within the oil tank drains into the electronic oil pump by gravity.

18. The snowmobile of claim 17, further comprising a filter disposed in the outlet of the oil tank upstream of the inlet of the electronic oil pump.

19. The snowmobile of claim 1, further comprising:
   an air temperature sensor to provide a signal indicative of an ambient air temperature; and
   wherein the ECU controls the actuation of the electronic oil pump based at least in part on the signal indicative of the ambient air temperature.

20. The snowmobile of claim 19, further comprising an air intake system fluidly connected to the engine; and
   wherein the air temperature sensor is disposed in the air intake system.

21. A snowmobile comprising:
   a frame, the frame including:
      an engine compartment; and
      a tunnel rearward of the engine compartment;
   an endless drive track disposed below the tunnel for propelling the snowmobile;
   a pair of skis operatively connected to the frame;
   an engine disposed in the engine compartment, the engine being operatively connected to the endless drive track, the engine comprising:
      at least one cylinder;
      a crankcase connected to the at least one cylinder; and
      at least one exhaust valve connected to the at least one cylinder;
   an electronic oil pump having an inlet, the electronic oil pump fluidly communicating with the crankcase and the at least one exhaust valve;
   an oil tank fluidly communicating with the inlet of the electronic oil pump for supplying oil to the electronic oil pump, the electronic oil pump delivering oil from the oil tank to the crankcase and the at least one exhaust valve; and
   an electronic control unit (ECU) electrically connected to the electronic oil pump for controlling actuation of the electronic oil pump,
   the electronic oil pump including at least one piston adapted to reciprocate about an axis perpendicular to the inlet of the electronic oil pump.

22. A snowmobile comprising:
   a frame, the frame including:
      an engine compartment; and
      a tunnel rearward of the engine compartment;
   an endless drive track disposed below the tunnel for propelling the snowmobile;
   a pair of skis operatively connected to the frame;
   an engine disposed in the engine compartment, the engine being operatively connected to the endless drive track, the engine comprising:
      at least one cylinder;
      a crankcase connected to the at least one cylinder; and
      at least one exhaust valve connected to the at least one cylinder;
   an electronic oil pump having an inlet, the electronic oil pump fluidly communicating with the crankcase and the at least one exhaust valve;
   an oil tank fluidly communicating with the inlet of the electronic oil pump for supplying oil to the electronic oil pump, the electronic oil pump delivering oil from the oil tank to the crankcase and the at least one exhaust valve;
   an electronic control unit (ECU) electrically connected to the electronic oil pump for controlling actuation of the electronic oil pump; and
   a plurality of hoses disposed at least in part externally of the engine, the plurality of hoses fluidly connecting the electronic oil pump to the crankcase and the at least one exhaust valve.

23. The snowmobile of claim 22, wherein:
   the at least one cylinder is a plurality of cylinders;
   the electronic oil pump has a first plurality of outlets fluidly communicating with the at least one exhaust valve, a number of the first plurality of outlets being equal to a number of the plurality of cylinders; and
   the electronic oil pump has a second plurality of outlets fluidly communicating with the crankcase, a number of the second plurality of outlets being equal to the number of the plurality of cylinders.

24. A snowmobile comprising:
   a frame, the frame including:
      an engine compartment; and
      a tunnel rearward of the engine compartment;
   an endless drive track disposed below the tunnel for propelling the snowmobile;
   a pair of skis operatively connected to the frame;
   an engine disposed in the engine compartment, the engine being operatively connected to the endless drive track, the engine comprising:
      at least one cylinder;
      a crankcase connected to the at least one cylinder; and
      at least one exhaust valve connected to the at least one cylinder;
   an electronic oil pump having an inlet, the electronic oil pump fluidly communicating with the crankcase and the at least one exhaust valve;
   an oil tank fluidly communicating with the inlet of the electronic oil pump for supplying oil to the electronic oil pump, the electronic oil pump delivering oil from the oil tank to the crankcase and the at least one exhaust valve; and
   an electronic control unit (ECU) electrically connected to the electronic oil pump for controlling actuation of the electronic oil pump, the electronic oil pump having at least one outlet angled relative to the inlet of the electronic oil pump.

25. The snowmobile of claim 24, wherein the electronic oil pump is disposed externally of the oil tank and is connected directly to an outlet of the oil tank below the outlet of the oil tank.

26. A snowmobile comprising:
a frame, the frame including:
an engine compartment; and
a tunnel rearward of the engine compartment;
an endless drive track disposed below the tunnel for propelling the snowmobile;
a pair of skis operatively connected to the frame;
an engine disposed in the engine compartment, the engine being operatively connected to the endless drive track, the engine comprising:
at least one cylinder;
a crankcase connected to the at least one cylinder; and
at least one exhaust valve connected to the at least one cylinder;
an electronic oil pump having an inlet, the electronic oil pump fluidly communicating with the crankcase and the at least one exhaust valve;
an oil tank fluidly communicating with the inlet of the electronic oil pump for supplying oil to the electronic oil pump, the electronic oil pump delivering oil from the oil tank to the crankcase and the at least one exhaust valve;
an electronic control unit (ECU) electrically connected to the electronic oil pump for controlling actuation of the electronic oil pump; and
an air temperature sensor to provide a signal indicative of an ambient air temperature, the ECU controlling the actuation of the electronic oil pump based at least in part on the signal indicative of the ambient air temperature,
when a sensed air temperature is lower than a predetermined temperature, a maximum engine speed being limited to be less than a normal operation engine speed limit to ensure sufficient lubrication to at least one of the crankcase and the at least one exhaust valve.

27. A snowmobile comprising:
a frame, the frame including:
an engine compartment; and
a tunnel rearward of the engine compartment;
an endless drive track disposed below the tunnel for propelling the snowmobile;
a pair of skis operatively connected to the frame;
an engine disposed in the engine compartment, the engine being operatively connected to the endless drive track, the engine comprising:
at least one cylinder;
a crankcase connected to the at least one cylinder; and
at least one exhaust valve connected to the at least one cylinder;
an electronic oil pump having an inlet, the electronic oil pump fluidly communicating with the crankcase and the at least one exhaust valve;
an oil tank fluidly communicating with the inlet of the electronic oil pump for supplying oil to the electronic oil pump, the electronic oil pump delivering oil from the oil tank to the crankcase and the at least one exhaust valve;
an electronic control unit (ECU) electrically connected to the electronic oil pump for controlling actuation of the electronic oil pump; and
an air temperature sensor to provide a signal indicative of an ambient air temperature, the ECU controlling the actuation of the electronic oil pump based at least in part on the signal indicative of the ambient air temperature,
when a sensed air temperature is lower than a predetermined temperature, a maximum degree of opening of the at least one exhaust valve being limited to be less than a normal operation maximum degree of opening of the at least one exhaust valve.

28. The snowmobile of claim 27, wherein when the sensed air temperature is lower than the predetermined temperature, a maximum engine speed is limited to be less than a normal operation engine speed limit.

29. A snowmobile comprising:
a frame including:
an engine compartment; and
a tunnel rearward of the engine compartment;
an endless drive track disposed below the tunnel for propelling the vehicle;
a pair of skis operatively connected to the frame;
a two-stroke engine disposed in the engine compartment, the two-stroke engine being operatively connected to the endless drive track, the two-stroke engine comprising:
at least one cylinder;
a crankcase connected to the at least one cylinder; and
at least one exhaust valve connected to the at least one cylinder, the at least one exhaust valve being located and arranged to regulate flow of exhaust gases through an exhaust port defined in the at least one cylinder;
an oil pump having an inlet, the oil pump fluidly communicating with the at least one exhaust valve;
an oil tank fluidly communicating with the inlet of the oil pump for supplying oil to the oil pump, the oil pump delivering oil from the oil tank to the at least one exhaust valve; and
a plurality of hoses disposed at least in part externally of the engine, at least one of the plurality of hoses fluidly connecting the oil pump to the at least one exhaust valve.

30. The snowmobile of claim 29, wherein:
the oil tank is disposed externally of the two-stroke engine; and
at least an other one of the plurality of hoses fluidly connect the oil pump to the crankcase.

* * * * *